United States Patent
Hamagishi et al.

(10) Patent No.: US 9,304,321 B2
(45) Date of Patent: Apr. 5, 2016

(54) THREE DIMENSIONAL IMAGE DISPLAY DEVICE AND METHOD OF DISPLAYING THREE DIMENSIONAL IMAGE

(71) Applicant: SAMSUNG DISPLAY CO., LTD., Yongin, Gyeonggi-Do (KR)

(72) Inventors: Goro Hamagishi, Hwaseong-Si (KR); Se Joon Oh, Suwon-Si (KR); Kyung Ho Jung, Seongnam-Si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 182 days.

(21) Appl. No.: 14/029,459

(22) Filed: Sep. 17, 2013

(65) Prior Publication Data

US 2014/0340402 A1    Nov. 20, 2014

(30) Foreign Application Priority Data

May 14, 2013   (KR) .................. 10-2013-0054493

(51) Int. Cl.
*G06T 15/00*    (2011.01)
*G02B 27/22*    (2006.01)
*H04N 13/04*    (2006.01)

(52) U.S. Cl.
CPC ........ *G02B 27/2264* (2013.01); *G02B 27/2214* (2013.01); *H04N 13/0404* (2013.01); *H04N 13/0409* (2013.01); *H04N 13/0415* (2013.01); *H04N 13/0422* (2013.01); *H04N 13/0447* (2013.01)

(58) Field of Classification Search
CPC ........... G02B 27/2214; G02B 27/2264; G02B 27/22; G02B 27/225; H04N 13/0404; H04N 13/0409; H04N 13/0402; H04N 13/0422; H04N 13/0413; H04N 13/0447; H04N 13/0415; H04N 13/0411
See application file for complete search history.

(56) References Cited

U.S. PATENT DOCUMENTS

2010/0097449 A1* 4/2010 Jeong et al. .................. 348/59
2012/0098827 A1* 4/2012 Yoshifuji et al. ............. 345/419
(Continued)

FOREIGN PATENT DOCUMENTS

JP    2012-141400    7/2012
JP    2012-194257    10/2012
(Continued)

OTHER PUBLICATIONS

English Abstract for Publication No. 10-2012-0031400.
(Continued)

*Primary Examiner* — Lixi C Simpson
(74) *Attorney, Agent, or Firm* — F. Chau & Associates, LLC

(57) ABSTRACT

A time multiplexing multi-view point three dimensional image display device includes a display panel that includes a plurality of pixels arranged in a matrix form, where each pixel displays one color of a plurality of primary colors, and a view point division unit that divides the 3D image displayed by the display panel into two or more view points. The display panel includes a plurality of dots, each dot includes a set of pixels in which each pixel shows a different primary color. Each dot displays a 3D image for a view point during a frame set that includes a plurality of frames. The view point division unit moves in a row direction when the frame changes in the frame set, and at least one pixel one of the dot is selected in each frame of the frame set.

17 Claims, 47 Drawing Sheets

(56) References Cited

U.S. PATENT DOCUMENTS

| | | |
|---|---|---|
| 2012/0154395 A1 | 6/2012 | De La Barre et al. |
| 2013/0050283 A1* | 2/2013 | Sato ............................... 345/690 |
| 2014/0009463 A1* | 1/2014 | Watanabe et al. ............. 345/419 |
| 2014/0078194 A1* | 3/2014 | An et al. ........................ 345/691 |

FOREIGN PATENT DOCUMENTS

| | | |
|---|---|---|
| JP | 2012-203050 | 10/2012 |
| KR | 10-1058092 | 8/2011 |
| KR | 10-2012-0031400 | 4/2012 |
| KR | 10-2012-0100821 | 9/2012 |

OTHER PUBLICATIONS

English Abstract for Publication No. 2012-141400.
English Abstract for Publication No. 10-2012-0100821.
English Abstract for Publication No. 2012-194257.
English Abstract for Publication No. 2012-203050.
English Abstract for Publication No. 10-1058092.

* cited by examiner

THREE DIMENSIONAL IMAGE DISPLAY DEVICE AND METHOD OF DISPLAYING THREE DIMENSIONAL IMAGE

CROSS-REFERENCE TO RELATED APPLICATION

This application claims priority under 35 U.S.C. §119 from Korean Patent Application No. 10-2013-0054493 filed in the Korean Intellectual Property Office on May 14, 2013, and all the benefits accruing therefrom, the contents of which are herein incorporated by reference in their entirety.

BACKGROUND (a) Technical Field

Embodiments of the present disclosure are directed to a three dimensional image display device and a method of displaying a three dimensional image, and more particularly, to a three dimensional image display device and a method of displaying a three dimensional image that complements a color a time multiplexing multi-view point three dimensional image display device by time multiplexing.

(b) Discussion of the Related Art

Recently, three dimensional (3D) image display devices and methods of displaying 3D images have been the subject of much research.

In general, a 3D image display technology uses binocular parallax express three dimensional effects at a short distance. That is, different 2D images are transmitted to the left eye and the right eye, hereinafter respectively referred to as the "left eye image" and the "right eye image", and when the left eye image and the right eye image signals are transferred to the brain, the left eye image and the right eye image are converged to be recognized as a 3D image having depth.

3D image display devices that use binocular parallax include a stereoscopic type 3D image display device, which uses glasses such as shutter glasses and polarized glasses, and an autostereoscopic type 3D image display device, which does not use glasses but rather an optical system such as a lenticular lens and a parallax barrier in the display device.

In the autostereoscopic type, a 3D image is implemented by dividing and displaying the 3D image into multiple view points by means of the lenticular lens or a parallax barrier having a plurality of openings.

SUMMARY

Embodiments of the present disclosure can provide a three dimensional image display device and a method for displaying a three dimensional image that can optimize the resolution of the three dimensional image observed in each view point in an autostereoscopic three dimensional image display device.

An exemplary embodiment of the present disclosure provides a time multiplexing multi-view point three dimensional image display device, including: a display panel that includes a plurality of pixels arranged in a matrix form, each pixel displaying one color of a plurality of primary colors; and a view point division unit that divides the 3D image displayed by the display panel into two or more view points, in which the display panel includes a plurality of dots, each dot includes a set of pixels, each pixel shows a different primary color, and each dot displays a 3D image for a view point during a frame set that includes a plurality of frames, the view point division unit moves in a row direction when a frame changes in the frame set, and at least one pixel of the dot is selected to display the 3D image in each frame of the frame set.

Another exemplary embodiment of the present disclosure provides a method of displaying a three dimensional image, including: displaying, by a display panel, a 3D image during a frame set that includes a plurality of frames; dividing, by a view point division unit, the 3D image into two or more view points; and moving the view point division unit in a row direction when a frame changes in the frame set, in which the display panel includes a plurality of pixels arranged in a matrix form, each pixel display one color of a plurality of primary colors, and a plurality of dots, each including a set of pixels, each pixel showing a different primary color, and at least one pixel of the dot is selected to display the 3D image in each frame of the frame set.

The view point division unit may include a plurality of view point division elements that correspond to each set of the plurality of pixels that display respective images in the two or more view points, and primary colors of a first pixel row and an adjacent second pixel row that correspond to one view point division element may differ from each other.

A resolution of the 3D image displayed for one frame set may be approximately ½ with respect to all pixels in a column direction and approximately ½ or more with respect to all pixels in a row direction.

The view point division unit may include a plurality of lenticular lenses or a parallax barrier that includes a plurality of openings.

The view point division element may be inclined to form an acute angle with the column direction, and pixels of a pixel column may show a same primary color.

The view point division elements may extend parallel to the column direction, and pixels in a line that show a same primary color may be arranged in a diagonal direction.

A number of the primary colors may be 3, and a number of the two or more view points is not a multiple of 3.

When a frame set includes two frames, two pixels of one dot may be selected in one first frame of the two frames, and the other one pixel of the one dot may be selected in the other frame of the two frames.

Another exemplary embodiment of the present disclosure provides a three dimensional image display device, including: a display panel that includes a plurality of dots each dot comprises a set of pixels, each pixel shows a different primary color, and each dot displays a 3D image for a view point during a frame set that includes a plurality of frames; and a view point division unit includes a plurality of view point division elements that correspond to each set of a plurality of pixels that display respective images in the two or more view points. When a frame set includes two frames, two pixels of one dot are selected for display in one frame of the two frames, and the other one pixel of the one dot is selected for display in the other frame of the two frames.

A resolution of the 3D image displayed for one frame set may be approximately ½ with respect to all pixels in a column direction and approximately ½ or more with respect to all pixels in a row direction.

The view point division unit may move in a row direction when a frame changes in the frame set, and primary colors of a first pixel row and an adjacent second pixel row that correspond to one view point division element may differ from each other.

The view point division unit may include either a plurality of lenticular lenses or a parallax barrier that includes a plurality of openings.

According to exemplary embodiments of the present disclosure, a resolution of a 3D image observed in each view point can be optimized by configuring a base color of one dot of the 3D image by time multiplexing in an autostereoscopic time multiplexing multi-view point three dimensional image display device.

DETAILED DESCRIPTION OF EXEMPLARY EMBODIMENTS

Embodiments of the present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

First, a 3D image display device according to an exemplary embodiment of the present disclosure will be described with reference to FIGS. 1 and 2.

Figure 1:
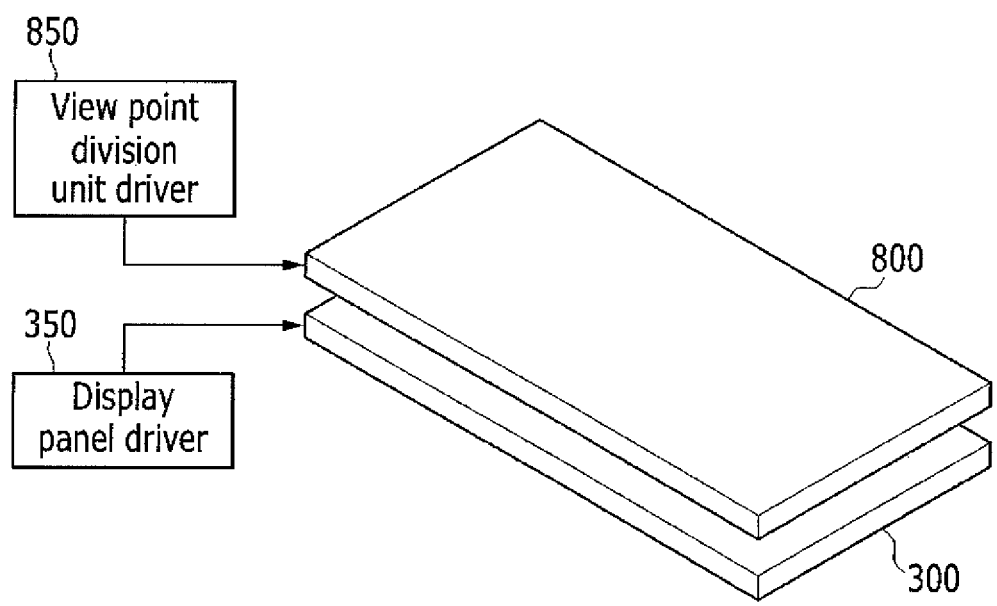
FIG. 1 is a schematic perspective view of a 3D image display device according to an exemplary embodiment of the present disclosure.
Figure 2:
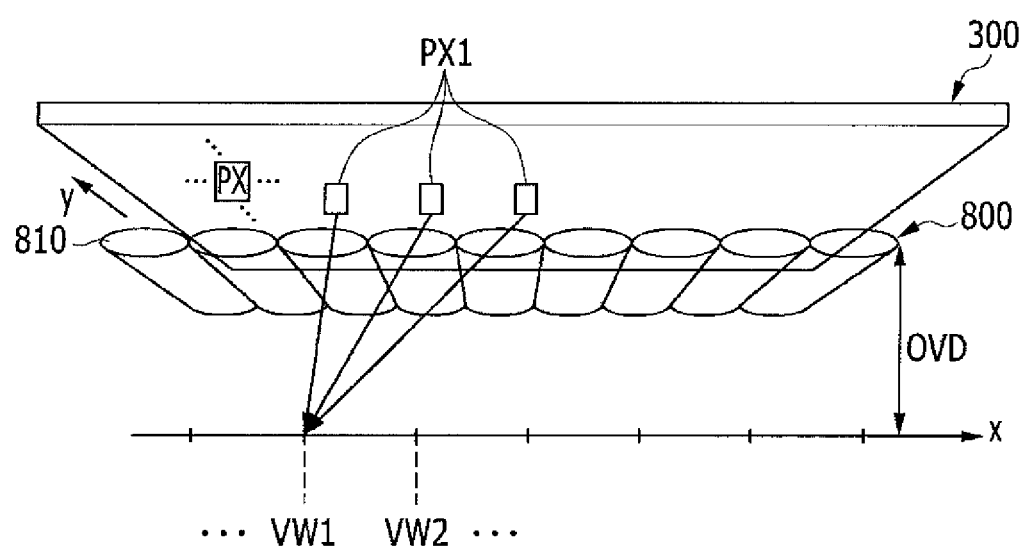
FIG. 2 is a schematic side perspective view of the 3D image display device according to an exemplary embodiment of the present disclosure.

FIG. 1 is a schematic perspective view of a 3D image display device according to an exemplary embodiment of the present disclosure, and FIG. 2 is a schematic side perspective view of the 3D image display device according to an exemplary embodiment of the present disclosure.

Referring to FIG. 1, a 3D image display device according to an exemplary embodiment of the present disclosure includes a display panel 300, a display panel driver 350, a view point division unit 800, and a view point division unit driver 850.

The display panel 300 displays an image, and may be a display device such as a plasma display panel (PDP), a liquid crystal display, an organic light emitting display, etc.

Referring to FIG. 2, the display panel 300 includes a plurality of signal lines and a plurality of pixels PXs connected to the signal lines when viewed from an equivalent circuit. The plurality of pixels PXs may be arranged in a substantially matrix form. In FIG. 2, the row direction is represented by an x-axial direction, and the column direction is represented by a y-axial direction. Each pixel PX may include a switching element such as a thin film transistor connected to the signal line and a pixel electrode connected to the switching element. The signal lines may include a plurality of gate lines transferring gate signals, referred to as "scan signals", and a plurality of data lines transferring data voltages.

A pixel PX can uniquely display one primary color in a spatial division arrangement, or a plurality of pixels PXs can alternately display a primary color over time, in a temporal division arrangement, and as a result, a desired color may be displayed from the spatial or temporal sum of the primary colors. The primary colors may include three primary colors such as red (R), green (G), and blue (B). A set of pixels PXs which display different primary colors may be configured together as one dot. A one dot display unit of a 3D image may display white. The pixels PXs in one pixel column may display the same primary color, but are not limited thereto, and pixels PXs arranged in a diagonal direction having a predetermined angle may also display the same primary color.

The display panel driver 350 transfers various driving signals such as a gate signal and a data signal to the display panel 300 to drive the display panel 300.

Referring to FIG. 2, the view point division unit 800 divides light emitted by each pixel PX of the display panel 300 to transmit the light to a view points VW1, VW2, . . . , corresponding to each pixel PX. Let a distance between the 3D image display device and a point suitable for viewing an optimal 3D image be called an optimal viewing distance OVD, and let an x-axial directional position of a point that is the optimal viewing distance OVD from each pixel PX be called a view point. Each pixel PX of the display panel 300 according to an exemplary embodiment of the present disclosure corresponds to one view point VW1, VW2, . . . , and each pixel PX may transmit light to the corresponding view point VW1, VW2, . . . , through the view point division unit 800. A viewer views different images in each eye at different view points and thus may perceive depth, that is, perceive a 3D effect.

FIG. 2 illustrates a finite number of view points VW1, VW2, . . . , positioned at the optimal viewing distance OVD. For example, let a view point at which an image displayed by a first pixel PX1 is viewed be a first view point VW1. The light displayed by each of the first pixels PX1s may reach the first view point VW1 through the view point division unit 800.

Figure 3:
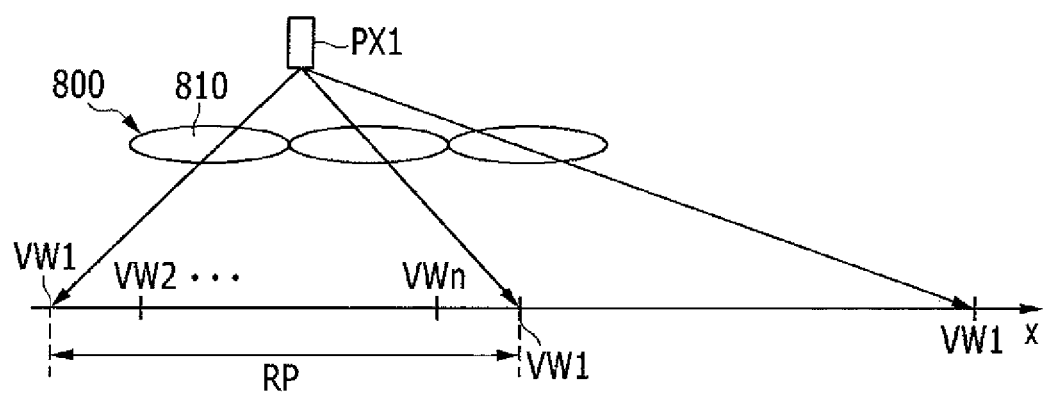
FIGS. 3 and 4 are diagrams of a view point division unit of a 3D image display device and a view point by the view point division unit according to an exemplary embodiment of the present disclosure.
Figure 4:
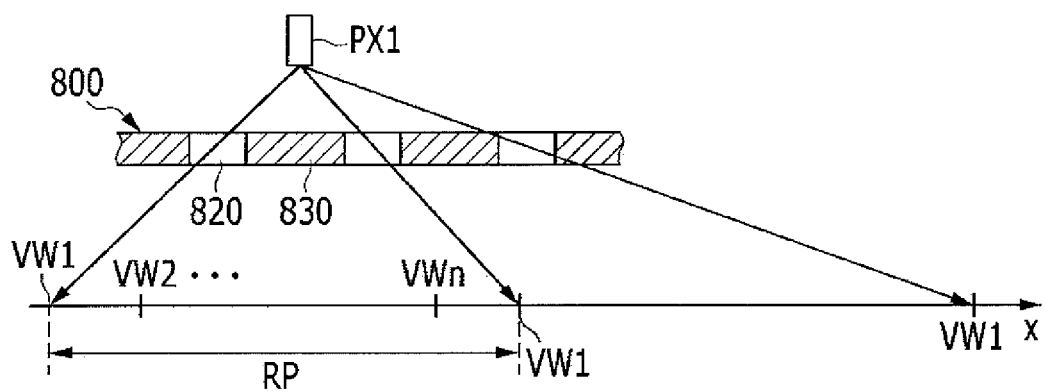

Referring to FIGS. 3 and 4, the image displayed on the display panel 300 may reach any one view point VW1, . . . , VWn (n is a natural number) of a unit viewing area RP through the view point division unit 800, where the unit viewing area RP has a predetermined viewing angle. That is, the view points VW1-VWn exist for each unit viewing area RP, and a corresponding view point of each pixel PX may be allocated in each unit viewing area RP according to a position reached by light. The unit viewing areas RP may repeat periodically on the optimal view distance OVD, and the order of the view points VW1-VWn may be the same in each unit viewing area RP.

Referring to FIGS. 2 and 3, a view point division unit 800 according to an exemplary embodiment of the present disclosure may include a plurality of lenticular lenses 810 arranged in one direction. Each lenticular lens 810 may be elongated in one direction. Adjacent pixel rows corresponding to each lenticular lens 810 may have different color arrangements. That is, the first pixels PX1s in adjacent pixel rows corresponding to each lenticular lens 810 may display different primary colors. To this end, each lenticular lens 810 may either be inclined to extend at an acute angle with respect to a y-axial direction, or may extend substantially parallel to the y-axial direction.

Referring to FIG. 4, the view point division unit 800 according to an exemplary embodiment of the present disclosure may include a parallax barrier including a plurality of openings 820 and a light blocking unit 830. The openings 820 may be arranged in a line that is either inclined to form an acute angle with respect to the y-axial direction like the extension direction of the lens, or may extend substantially parallel to the y-axial direction. When the view point division unit 800 includes a parallax barrier instead of lenticular lens 810, the extension direction of the lenticular lens in the figure represents the arrangement direction of the openings 820 corresponding to one view point.

FIGS. 1 and 2 illustrate that the view point division unit 800 is positioned between the display panel 300 and the viewer, but it is not limited thereto.

The view point division unit driver 850 is connected to the view point division unit 800 to generate a barrier driving signal for driving the view point division unit 800.

Then, a 3D image display method according to an exemplary embodiment of the present disclosure will be described with reference to FIGS. 5 and 6.

Figure 5:
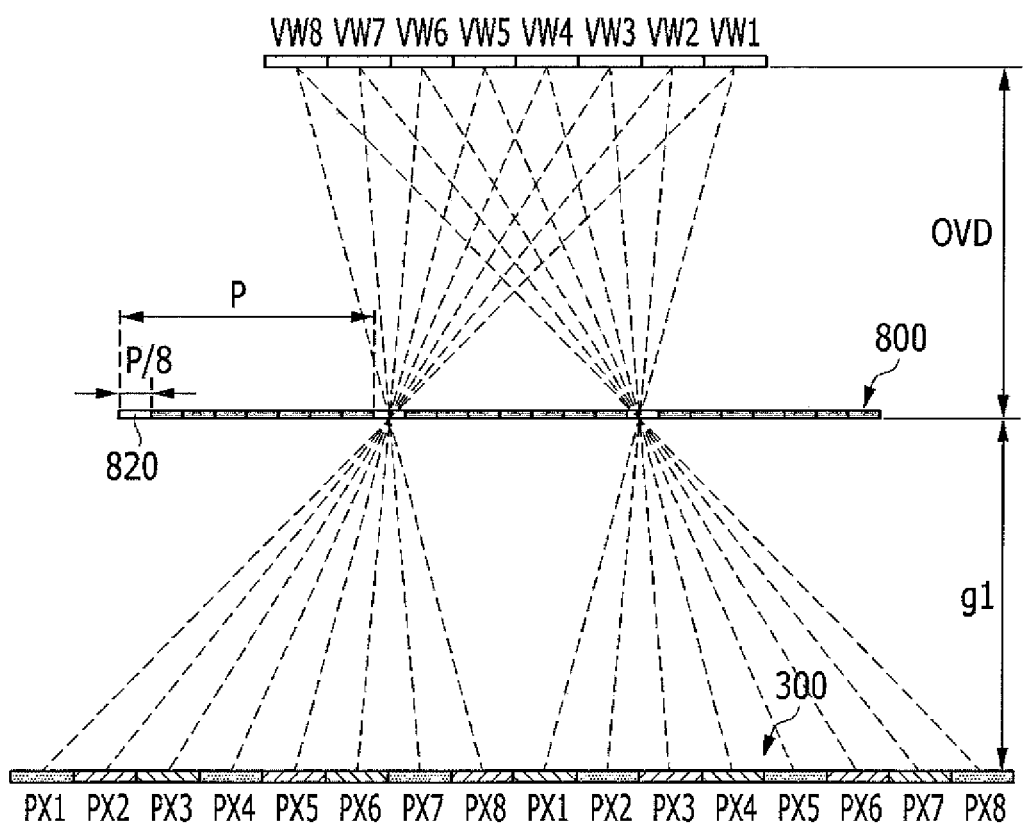
FIGS. 5 and 6 are diagrams of an example of a method of displaying one 3D image for two frames by time multiplexing by a 3D image display device according to an exemplary embodiment of the present disclosure.
Figure 6:
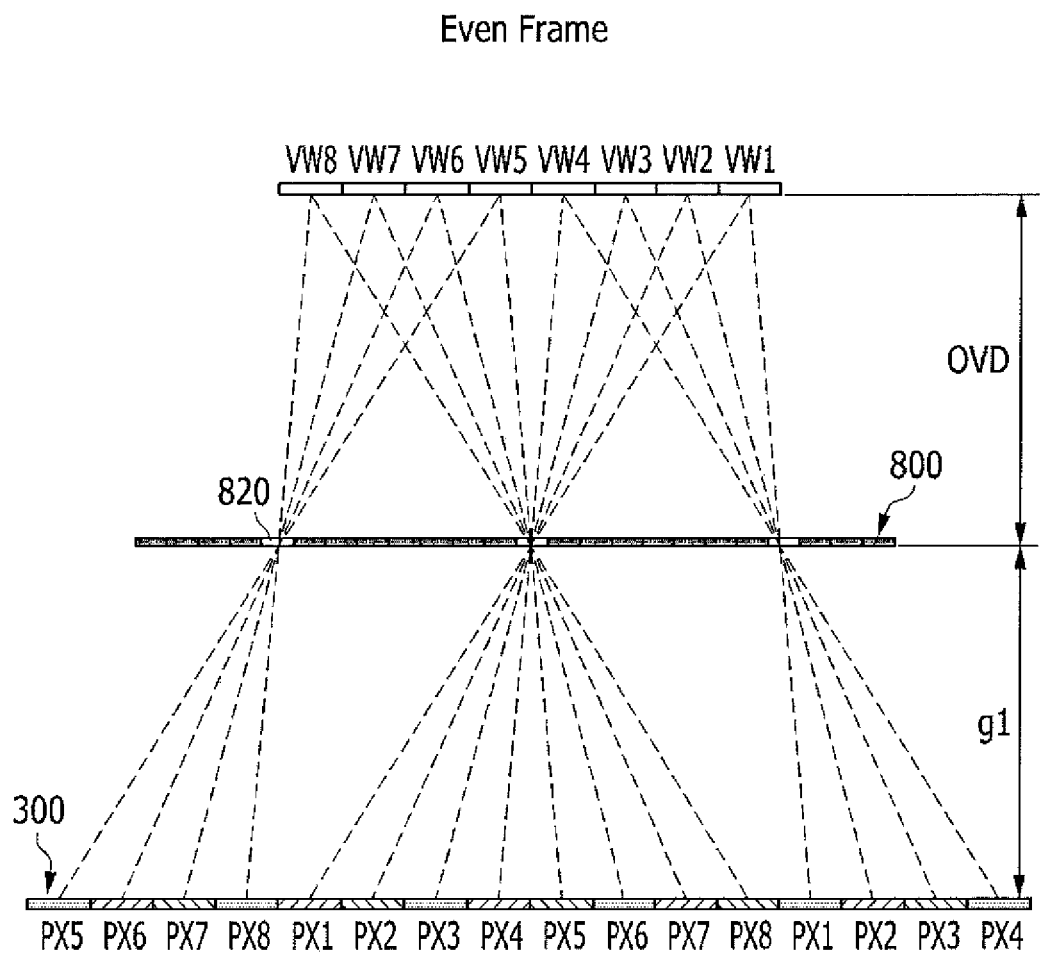

FIGS. 5 and 6 illustrate an example of a method of using time multiplexing to display a 3D image for two frames according to an exemplary embodiment of the present disclosure.

A time multiplexing multi-view point 3D image display device according to an exemplary embodiment of the present disclosure can display a 3D image for a plurality of frames. In more detail, a 3D image is displayed through one dot, which is a set of pixels for each different primary color, and each dot expressing the 3D image displays the corresponding 3D image for the plurality of frames. A set of the plurality of frames is called a frame set.

For convenience of description, hereinafter, an example is described of one frame set displaying a 3D image that includes two frames, using primary colors, R, G, and B. However, exemplary embodiments of the present disclosure are not limited thereto.

FIGS. 5 and 6 illustrate an example in which the number of view points is eight. According to an exemplary embodiment, the display panel 300 may include a first pixel to an eighth pixel PX1, PX2, . . . , PX8 which display 3D images corresponding to a first view point to an eighth view point VW1, VW2, . . . , VW8, respectively. The first to eighth pixels PX1, PX2, . . . , PX8 may be periodically arranged in every pixel row. The images displayed by the first to eighth pixels PX1, PX2, . . . , PX8 may be viewed at the corresponding first to eighth view points VW1, VW2, . . . , VW8 through the lenticular lenses 810 of the view point division unit 800 or the openings 820 of the parallax barrier. To this end, it is possible to appropriately control conditions such as the width of the lenticular lens 810 or the opening 820, the arrangement direction of the openings 820 or the extension direction of the lenses, the optical viewing distance OVD, or a distance g1 between the display panel 300 and the view point division unit 800. In the case where the view point division unit 800 includes the parallax barrier, a width of each opening 820 may be approximately ⅛ of a pitch P of the opening 820, but is not limited thereto.

An element of the view point division unit 800 that corresponds to one set of the first to eighth pixels PX1, PX2, . . . , PX8 corresponding to each view point of the unit viewing area RP is called a view point division element. The view point division unit 800 may include a plurality of view point division elements. For example, in the case where the view point division unit 800 is the lenticular lens 810, each lenticular lens 810 corresponds to a view point division element, and in the case where the view point division unit 800 is the parallax barrier, the openings 820 arranged in a line may correspond to the view point division element.

Let a first frame of two frames displaying a 3D image be referred to as an odd frame and a second frame be referred to as an even frame. Then, the respective pixels PXs1, PX2, . . . , PX8 may display images corresponding to different view points VW1, VW2, . . . , VW8 in the odd frame and the even frame. For example, as illustrated in FIGS. 5 and 6, in the case where the first to eighth pixels PX1, PX2, . . . , PX8 displays corresponding images in sequence at the first to eighth view points VW1, VW2, . . . , VW8 in the odd frame, the first to eighth pixels PX1, PX2, . . . , PX8 may display corresponding images in sequence at the fifth to eighth view points and the first to fourth view points VW5, VW6, VW7, VW8, VW1, VW2, VW3, and VW4 in the even frame. To this end, a position of the lenticular lens 810 of the view point division unit 800 or the opening 820 of the parallax barrier change in a row direction when the frame changes.

For example, the lenticular lens 810 or the parallax barrier opening 820 may move in an x-axial direction, that is, a row direction when the frame changes. FIGS. 5 and 6 illustrate an example in which the lenticular lens 810 or the parallax barrier opening 820 moves approximately ½ of one pitch P when the frame changes.

Now, a time multiplexing multi-view point 3D image display device and a method of displaying a 3D image according to exemplary embodiments of the present disclosure will be described in detail with reference to FIGS. 7 to 9 in addition to FIGS. 1 to 6 described above.

Figure 7:
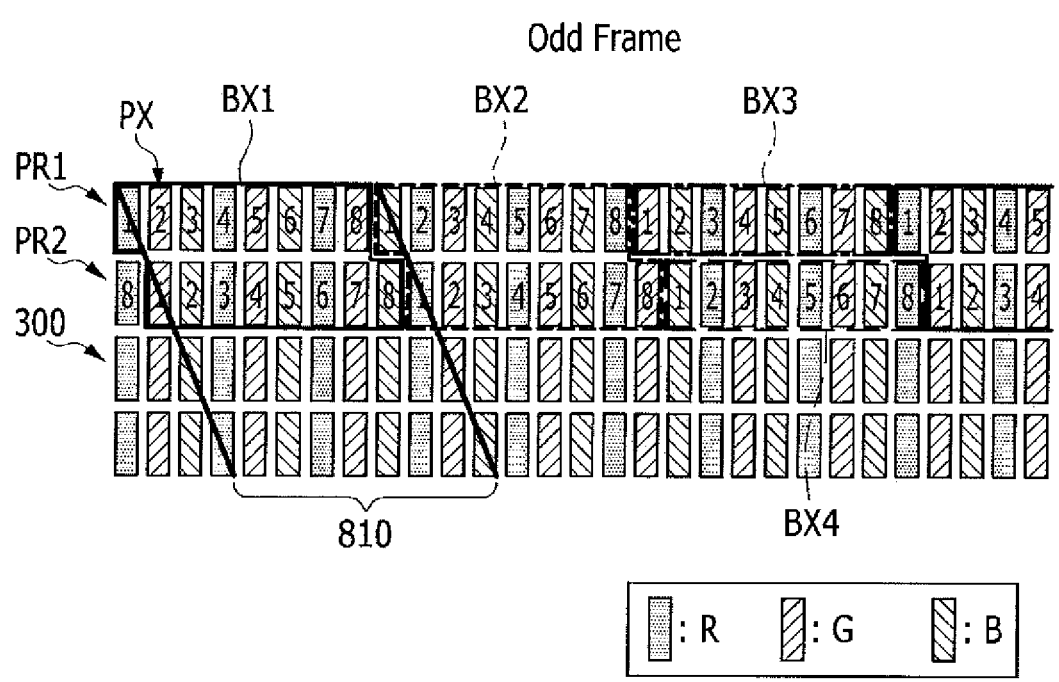
FIGS. 7 and 8 are plan views of an example of a method of displaying one 3D image for two frames by time multiplexing by a 3D image display device according to an exemplary embodiment of the present disclosure.
Figure 8:
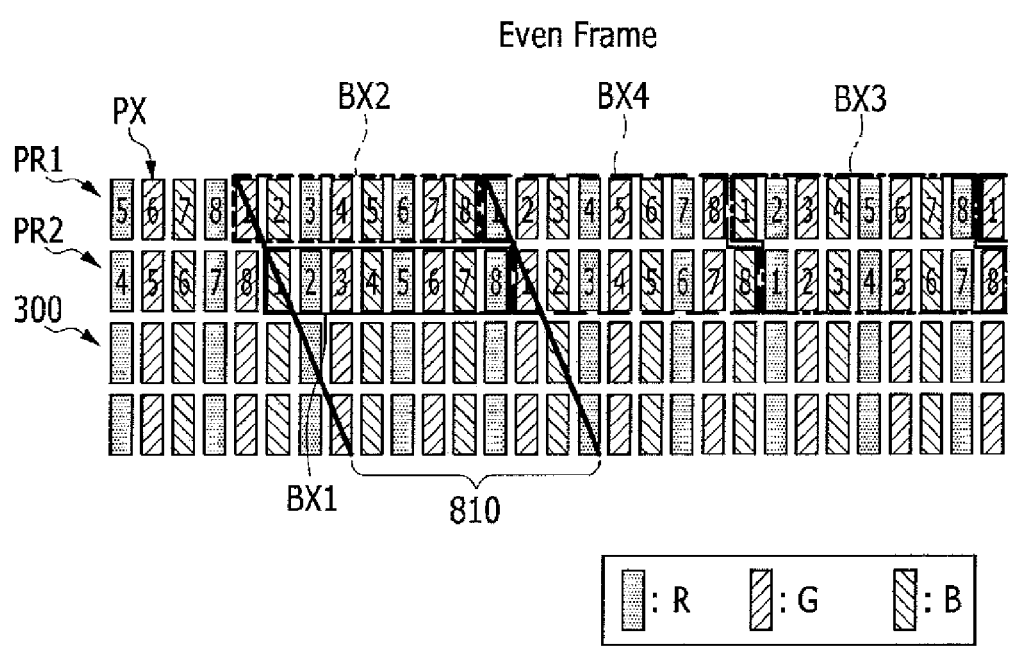
Figure 9:
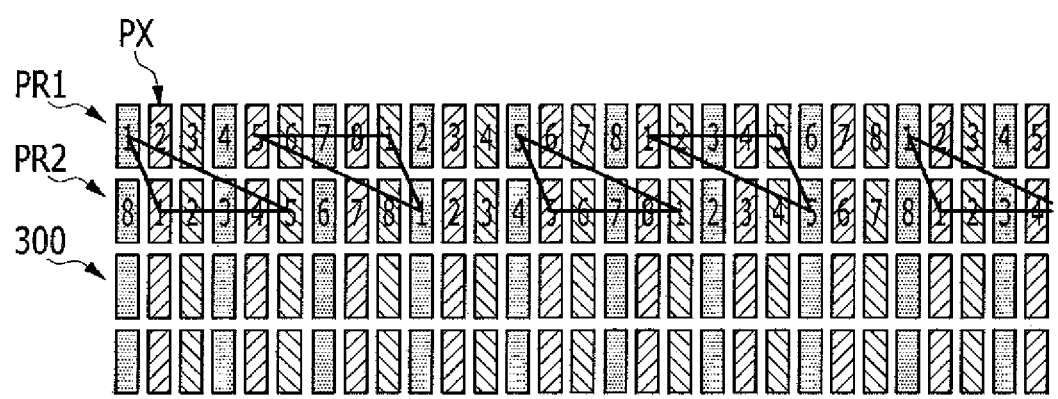
FIG. 9 is a plan view of the position of a pixel showing primary colors constituting one dot of an image observed in one view point for two frames when a 3D image is displayed by the method illustrated in FIGS. 7 and 8.
Figure 9:
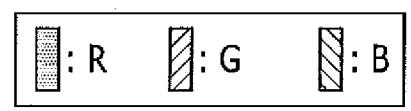

FIGS. 7 and 8 are plan views of an example of a method of using time multiplexing to display a 3D image for two frames, according to an exemplary embodiment of the present disclosure, and FIG. 9 is a plan view of primary color pixels positions that configure one dot of an image viewed at one view point for two frames when a 3D image is displayed by the method illustrated in FIGS. 7 and 8.

Referring to FIGS. 7 to 9, a 3D image display device according to an exemplary embodiment of the present disclosure may display, for example, images of eight view points, and the pixels PXs displaying the images corresponding to the eight view points may be periodically arranged in each pixel row. Further, pixels PXs expressing one primary color R, G, and B may be arranged in one pixel column, and the R, G, and B pixel columns may be alternately arranged in a row direction.

In an exemplary embodiment, the primary color arrangements of two adjacent pixel rows PR1 and PR2 which correspond to a view point division element may differ from each other. For example, the color arrangements of two adjacent pixel rows PR1 and PR2 that correspond to each lenticular lens 810 for each view point division element may differ from each other, and as a result, the primary colors expressed by the first pixel PX may be different in the two pixel rows PR1 and PR2. To this end, as described above, the extension direction of each lenticular lens 810 may either be inclined to form an acute angle with a y-axial direction, or may extend substantially parallel to the y-axial direction.

In an exemplary embodiment, the lenticular lens of the view point division unit 800 is illustrated, and in this case, the extension direction of the lenticular lens is inclined at a predetermined angle with respect to a column direction. In an exemplary embodiment illustrated in FIGS. 7 to 9, the lenticular lens 810 may extend substantially parallel to a virtual line connecting pixels PXs adjacent to each other in a diagonal direction. In this case, a slope of the lenticular lens 810 with respect to the longitudinal direction may be approximately (a pitch in a row direction of one pixel PX)/(a pitch in a column direction of one pixel PX). A slope based on a longitudinal direction is tan θ when an angle between the vertical direction and the extension direction of the lenticular lens 810 is θ. Hereinafter, the row direction is referred to as a lateral direction or a horizontal direction, and the column direction is referred to as a longitudinal direction or a vertical direction.

Referring to FIGS. 7 and 8, when a frame changes, the lenticular lens 810 moves in a horizontal row direction to be positioned at different pixels PXs in adjacent frames. Accordingly, when the frame changes, a view point of the image displayed by each pixel PX also changes. In detail, the first to eighth pixels displaying respective 3D images corresponding to the first to eighth view points in the odd frame may display respective 3D images corresponding to the fifth to eighth view points and to the first to fourth view points in the even frame. In this case, the lenticular lens 810 may move right or left by approximately ½ of a pitch of the lenticular lens 810 when the frame changes. In the drawing, a number represented at the position of each pixel PX means a view point of an image displayed by the corresponding pixel, and hereinafter, this is the same.

As such, according to an exemplary embodiment of the present disclosure, when the pixels PXs displaying one view point for two frames of one frame set are described, lines that connect positions of the pixels PXs closest to each other that display different primary colors configure a triangle of one dot.

Referring to FIGS. 7 to 9, for example, three pixels PXs which are the closest of R, G, and B pixels PXs displaying the first view point VW1 for two frames are positioned in two pixel rows PR1 and PR2, and lines connecting the positions of the three pixels PXs form a triangle of one dot as illustrated in FIG. 9.

In this case, some of the three pixels PXs forming one dot are necessarily selected in each frame of one frame set. For example, in the odd frame, a R pixel and a G pixel displaying the first view point VW1 are selected in a first box BX1, which virtually binds the two pixel rows PR1 and PR2 of pixels PXs corresponding to one lenticular lens. In the even frame, a B pixel for the remaining primary color displaying the first view point VW1 is selected in the first box BX1, which virtually binds one pixel row PR2 of pixels PXs corresponding to the moved lenticular lens, which configures a triangle of one dot. In an exemplary embodiment, which is illustrated by three primary colors and two frames of one frame set, to configure one dot, the number of pixels PXs selected from each frame is one and two or two and one. Accordingly, the numbers of pixel rows included in the first box BX1 in the two frames differ from each other in the two frames.

Similarly, in a second box BX2 of the odd frame, the R pixel and the B pixel displaying the first view point VW1 are selected, and in the second box BX2 of the even frame, the G pixel for the remaining primary color displaying the first view point VW1 is selected, and as a result, a triangle of one dot may be configured. Further, in a third box BX3 of the odd frame, the G pixel displaying the first view point VW1 is selected, and in the third box BX3 of the even frame, the R pixel and the B pixel for the remaining primary colors displaying the first view point VW1 are selected, and as a result, a triangle of one dot may be configured. Further, in a fourth box BX4 of the odd frame, the B pixel displaying the first view point VW1 is selected, and in the fourth box BX4 of the even frame, the R pixel and the G pixel for the remaining primary colors displaying the first view point VW1 are selected, and as a result, a triangle of one dot may be configured.

Referring to FIGS. 7 and 8, the first to fourth boxes BX1 to BX4 for configuring one dot in each of the two pixel rows PR1 and PR2 may be periodically disposed in each frame, and a size thereof may vary for every frame. For example, in the odd frame, the first box BX1 and the second box BX2 are adjacent to each other in a row direction and respectively include two pixel rows PR1 and PR2, but in the even frame, include one pixel row PR1 or PR2 that are adjacent to each other in a column direction. In addition, in the odd frame, the third box BX3 and the fourth box BX4 are positioned next to the first and second boxes BX1 and BX2 and each respectively includes one pixel row PR1 or PR2 adjacent to each other in a column direction, but in the even frame, are adjacent to each other in a row direction and include two pixel rows PR1 and PR2, and are positioned next to the first and second boxes.

As such, a time multiplexing multi-view point 3D image display device according to an exemplary embodiment of the present disclosure configures one dot of a 3D image for a plurality of frames of one frame set, where one dot includes three primary colors R, G, and B, and the pixels PXs configuring one dot may be positioned throughout the two pixel rows PR1 and PR2. Accordingly, since one dot is positioned every two pixel rows when viewed in the vertical, column direction, resolution of approximately ½ with respect to all pixels in the column direction may be implemented.

Further, as illustrated in FIG. 9, triangles of two dots for one view point form a pair that is repeated every twelve pixel columns in a row direction in the two pixel rows PR1 and PR2. Two dots in all may be displayed in the twelve pixel columns for one pixel row, and as a result, resolution of approximately ½ with respect to all pixels in the row direction may be implemented in the horizontal, row direction.

As such, since a 3D image display device may display an image with a resolution of ½ in both the lateral and longitudinal directions with respect to all pixels in those directions, a deviation of image quality of the 3D image in the longitudinal and lateral directions can be removed, and as a result, optimal resolution may be acquired and image quality may be improved. A size of the triangle of one dot may be substantially constant with respect to each view point to improve the image quality.

In addition, since the image quality depends on a size of the triangle of one dot being small and uniform, a horizontal movement of the lenticular lens 810 may be close to approximately ½ of the pitch of the lenticular lens 810.

Now, a time multiplexing multi-view point 3D image display device and a method of a 3D image according to an exemplary embodiment of the present disclosure will be described in detail with reference to FIGS. 10 to 24 in addition to FIGS. 1 to 9 described above.

Figure 10:
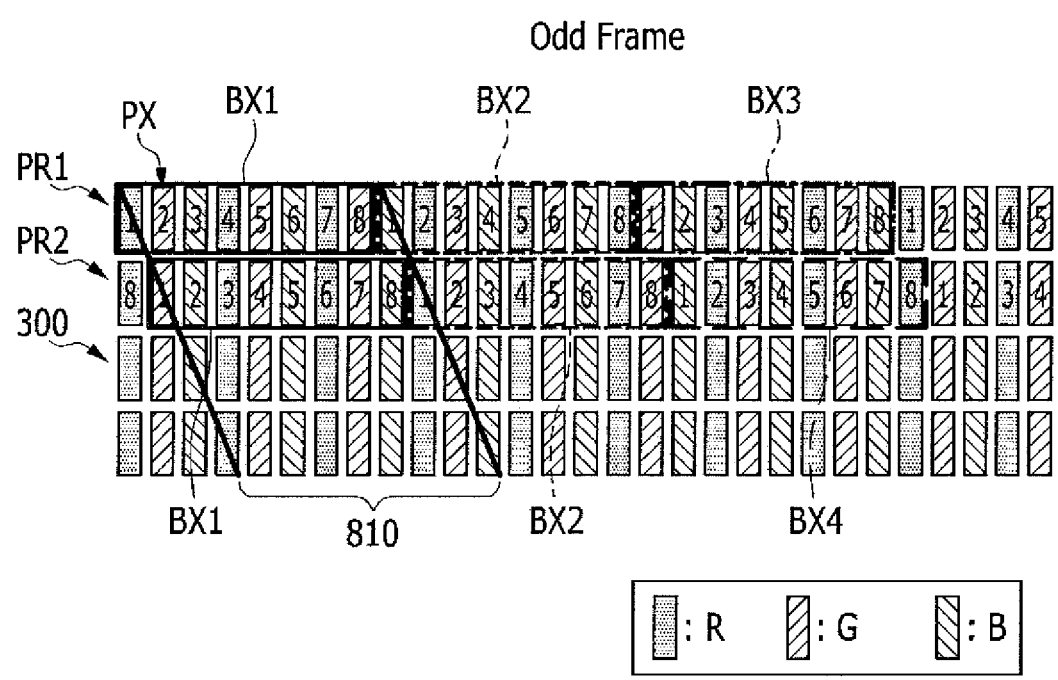
FIGS. 10 and 11 are plan views of one example of a method of displaying one 3D image for two frames by time multiplexing by a 3D image display device according to an exemplary embodiment of the present disclosure.
Figure 11:
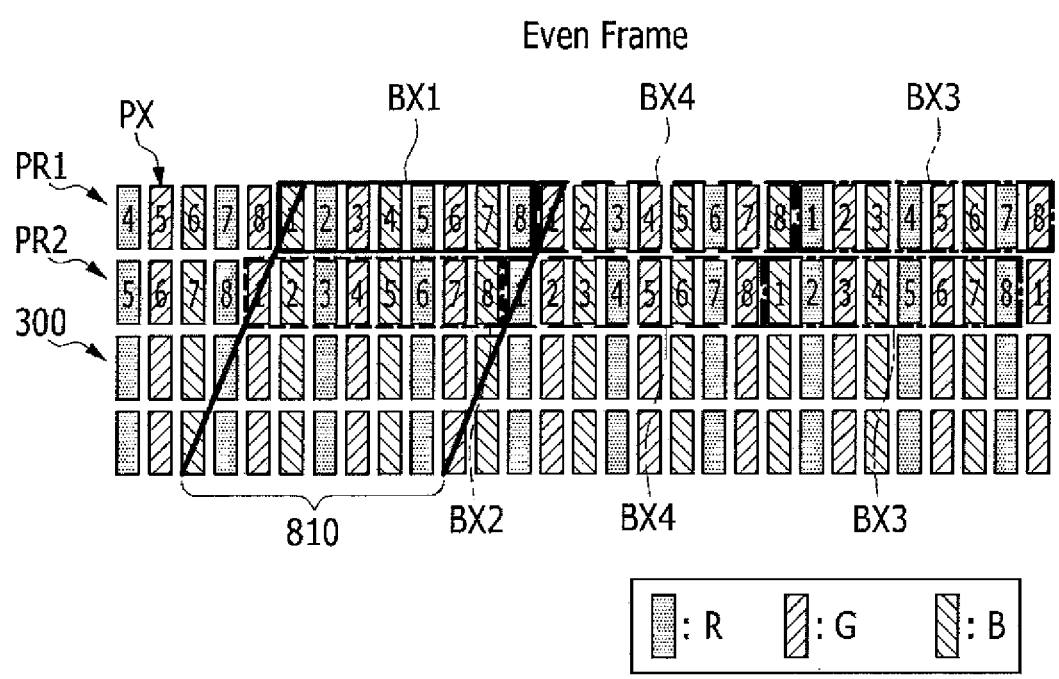
Figure 12:
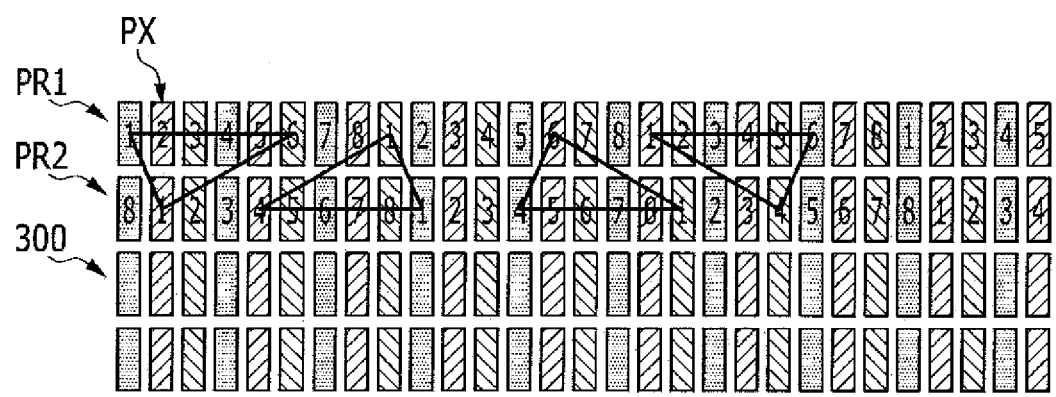
FIG. 12 is a plan view of the position of a pixel showing primary colors constituting one dot of an image observed in one view point for two frames when a 3D image is displayed by the method illustrated in FIGS. 10 and 11.
Figure 12:
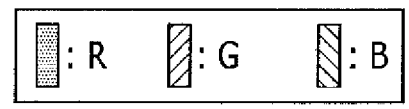
Figure 13:
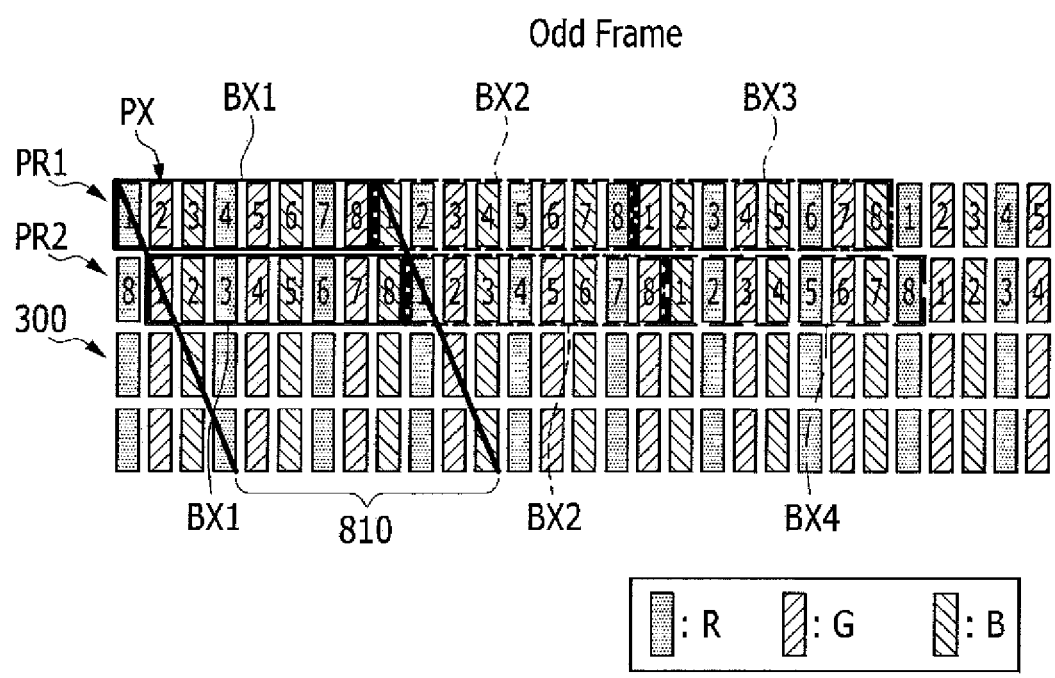
FIGS. 13 and 14 are plan views of an example of a method of displaying one 3D image for two frames by time multiplexing by a 3D image display device according to an exemplary embodiment of the present disclosure.
Figure 14:
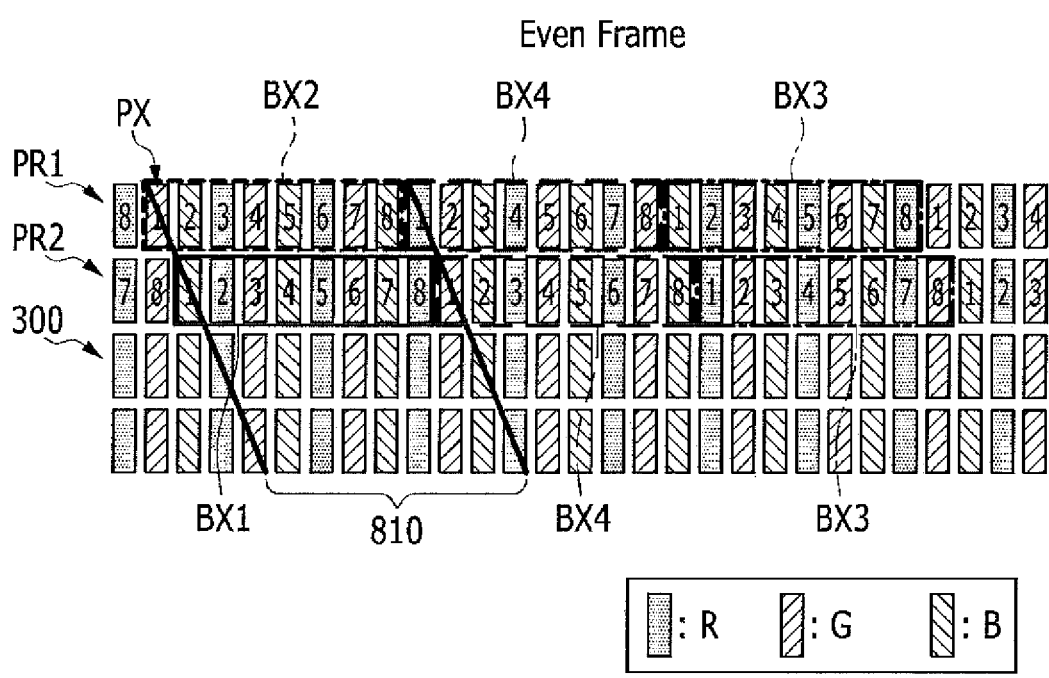
Figure 15:
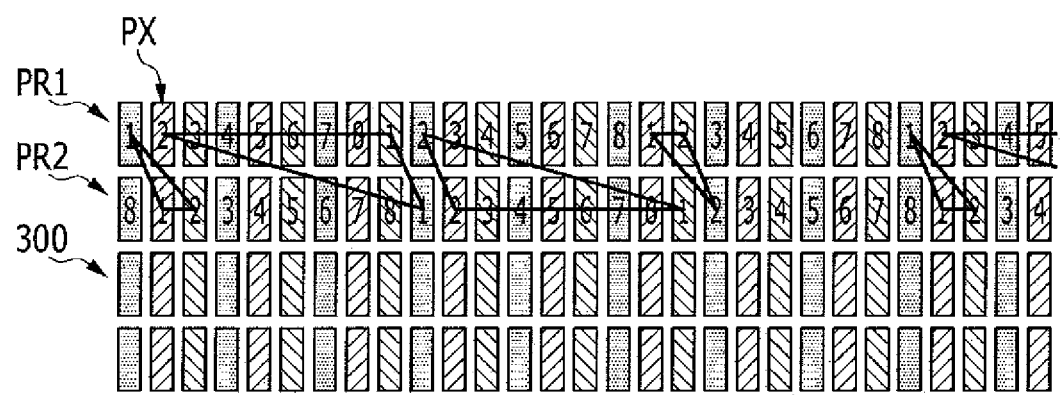
FIG. 15 is a plan view of the position of a pixel showing primary colors constituting one dot of an image observed in one view point for two frames when a 3D image is displayed by the method illustrated in FIGS. 13 and 14.
Figure 15:
Figure 16:
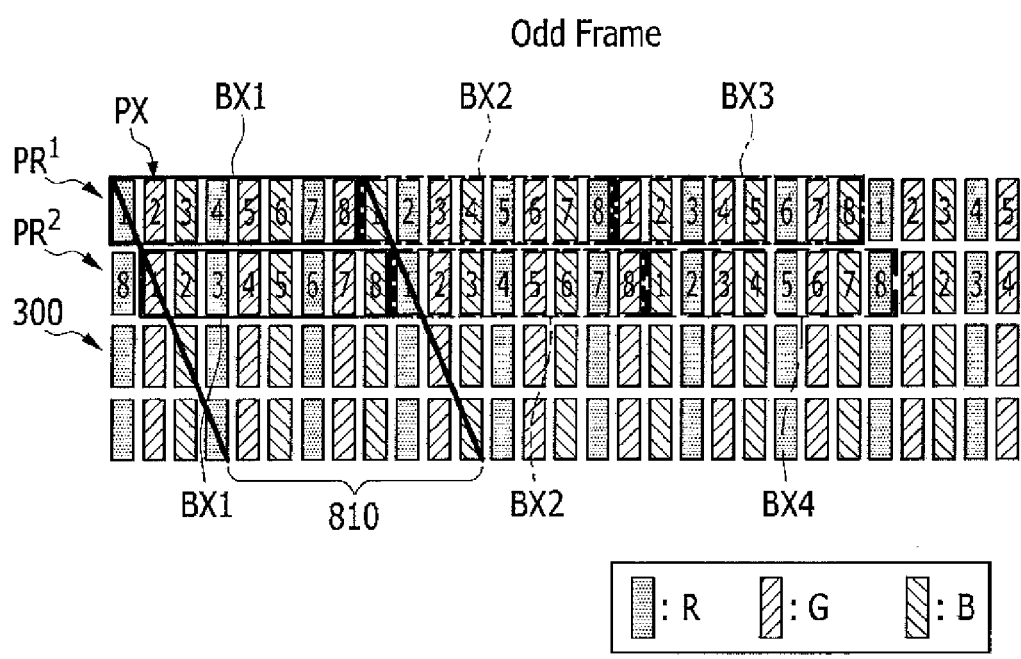
FIGS. 16 and 17 are plan views of one example of a method of displaying one 3D image for two frames by time multiplexing by a 3D image display device according to an exemplary embodiment of the present disclosure.
Figure 17:
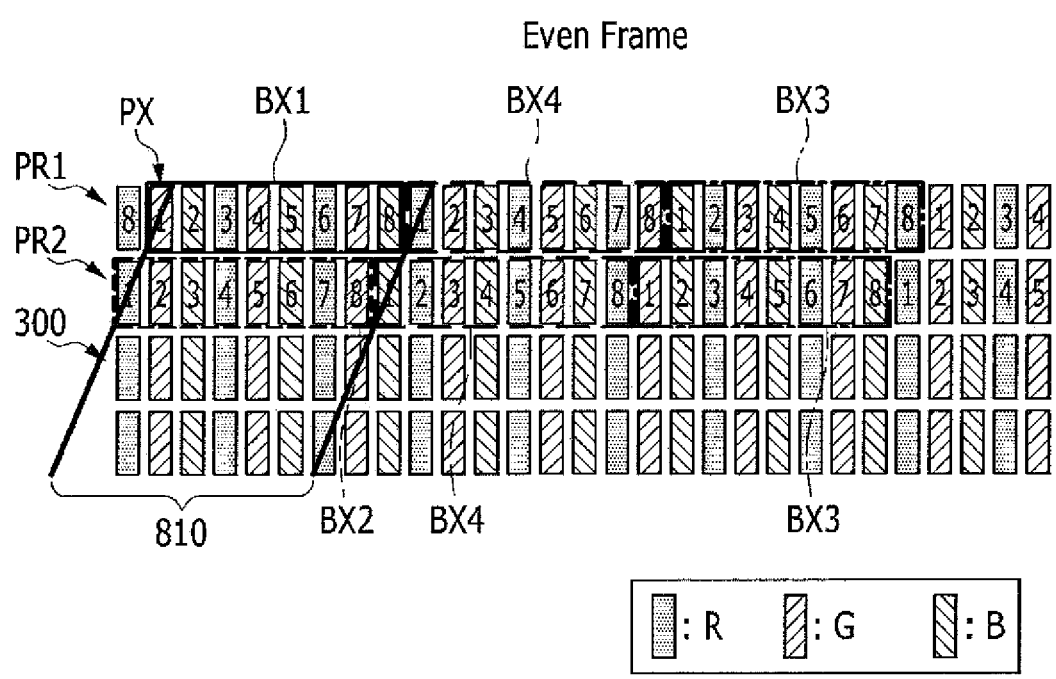
Figure 18:
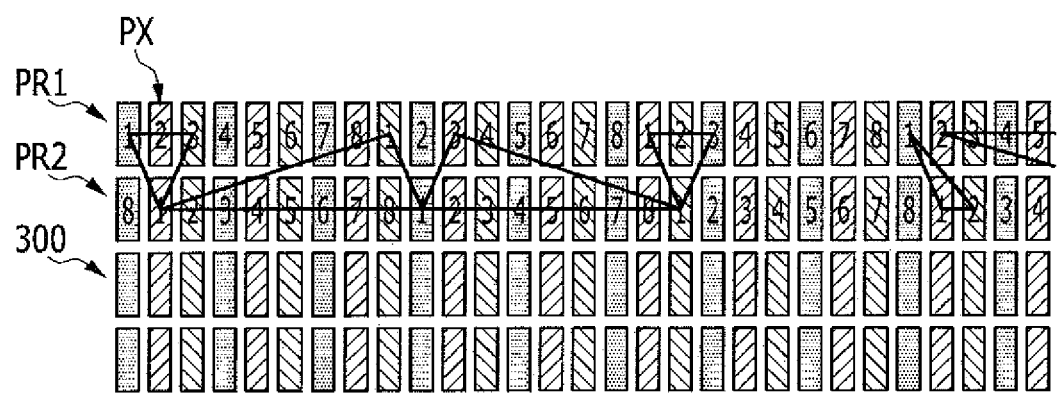
FIG. 18 is a plan view of the position of a pixel showing primary colors constituting one dot of an image observed in one view point for two frames when a 3D image is displayed by the method illustrated in FIGS. 16 and 17.
Figure 18:
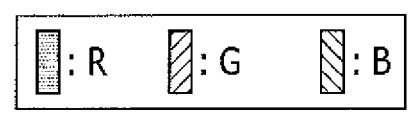

FIGS. 10 and 11 are plan views of one example of a method of displaying a 3D image for two frames by time multiplexing in a 3D image display device according to an exemplary embodiment of the present disclosure. FIG. 12 is a plan view of the position of a pixel showing primary colors constituting one dot of an image observed in one view point for two frames when a 3D image is displayed by the method illustrated in FIGS. 10 and 11. FIGS. 13 and 14 are plan views of one example of a method of displaying a 3D image for two frames by time multiplexing by a 3D image display device according to an exemplary embodiment of the present disclosure. FIG. 15 is a plan view of the position of a pixel showing primary colors constituting one dot of an image observed in one view point for two frames when a 3D image is displayed by the method illustrated in FIGS. 13 and 14. FIGS. 16 and 17 are plan views of one example of a method of displaying a 3D image for two frames by time multiplexing by a 3D image display device according to an exemplary embodiment of the present disclosure. FIG. 18 is a plan view of the position of a pixel showing primary colors constituting one dot of an image observed in one view point for two frames when a 3D image is displayed by the method illustrated in FIGS. 16 and 17. FIGS. 19 and 20, FIGS. 21 and 22, and FIGS. 23 and 24 are plan views of one example of a method in which a three dimensional image display device according to an exemplary embodiment of the present disclosure displays a 3D image by time multiplexing for two frames, and the primary color pixel positions of one dot of an image observed in one view point for two frames, respectively.

A 3D image display device and a 3D image displaying method according to an exemplary embodiment are essentially the same as the exemplary embodiment illustrated in FIGS. 7 to 9 described above, but illustrate other examples in which two dots that display each view point for two frames are formed in two pixel rows PR1 and PR2. In particular, when the frame changes, a horizontal movement distance or an inclined direction of the lenticular lens may vary.

First, referring to FIGS. 10 to 12, when the frame changes, the inclined direction with respect to a longitudinal direction of the lenticular lens 810 may change to be opposite to the inclined direction in a previous frame. Further, when the frame changes, the lenticular lens 810 may move right or left by approximately ½ of one pitch of the lenticular lens 810, as in an exemplary embodiment illustrated in FIGS. 7 to 9, when viewed based on the two pixel rows PR1 and PR2.

Next, referring to FIGS. 13 to 15, when the frame changes, the lenticular lens 810 may move right by approximately ⅛ of the lenticular lens 810 pitch or left by approximately ⅞ of the lenticular lens 810 pitch. In this case, the inclined direction of the lenticular lens 810 may be maintained even though the frame changes. Referring to FIG. 15, in an exemplary embodiment, the sizes of the dot triangles for one view point do not remain constant and may have a relatively large deviation.

Next, referring to FIGS. 16 to 18, when the frame changes, the inclined direction of the lenticular lens 810 with respect to the longitudinal direction may change to be opposite to the inclined direction in the previous frame. Further, when the frame changes, the lenticular lens 810 may move right by approximately ⅛ of the lenticular lens 810 pitch or left by approximately ⅞ of the lenticular lens 810 pitch, as in the exemplary embodiment illustrated in FIGS. 13 to 15 when viewed based on the two pixel rows PR1 and PR2. Referring to FIG. 18, in an exemplary embodiment, the sizes of the dot triangles for one view point do not remain constant and may have a relatively large deviation.

FIGS. 19 to 24 illustrate examples of methods of how the movement distances and the inclined directions of various lenticular lenses 810 change depending on the frame, which include the examples illustrated in FIGS. 7 to 18 described above in the case of displaying eight view points of a 3D image.

Figure 19:
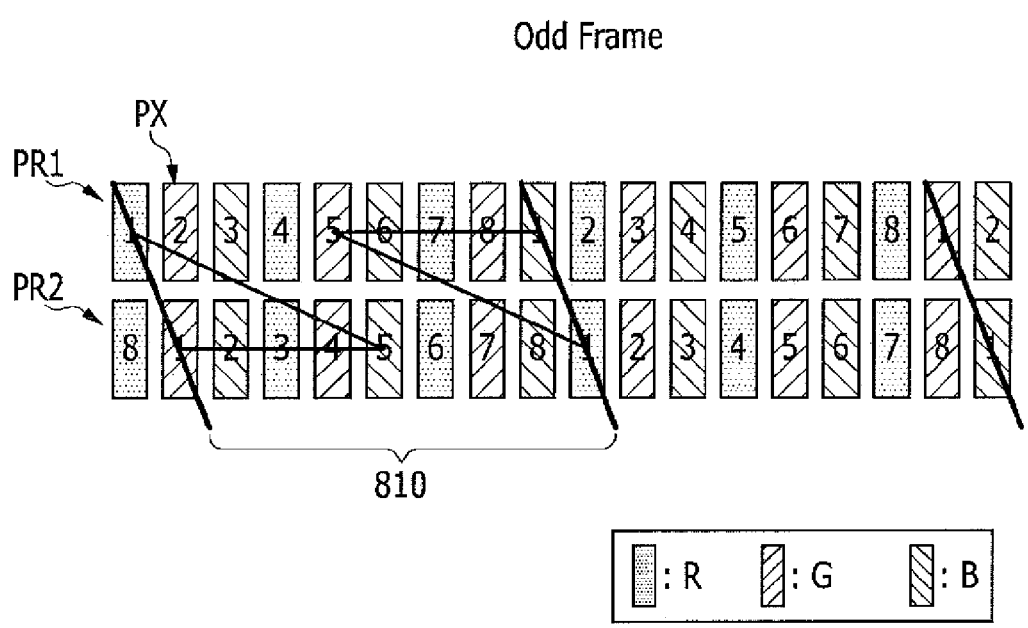
FIGS. 19 and 20, FIGS. 21 and 22, and FIGS. 23 and 24 are plan views of an example of a method in which a three dimensional image display device according to an exemplary embodiment of the present disclosure displays one 3D image by time multiplexing for two frames, and the primary color pixel positions of one dot of an image observed in one view point for two frames, respectively.
Figure 20:
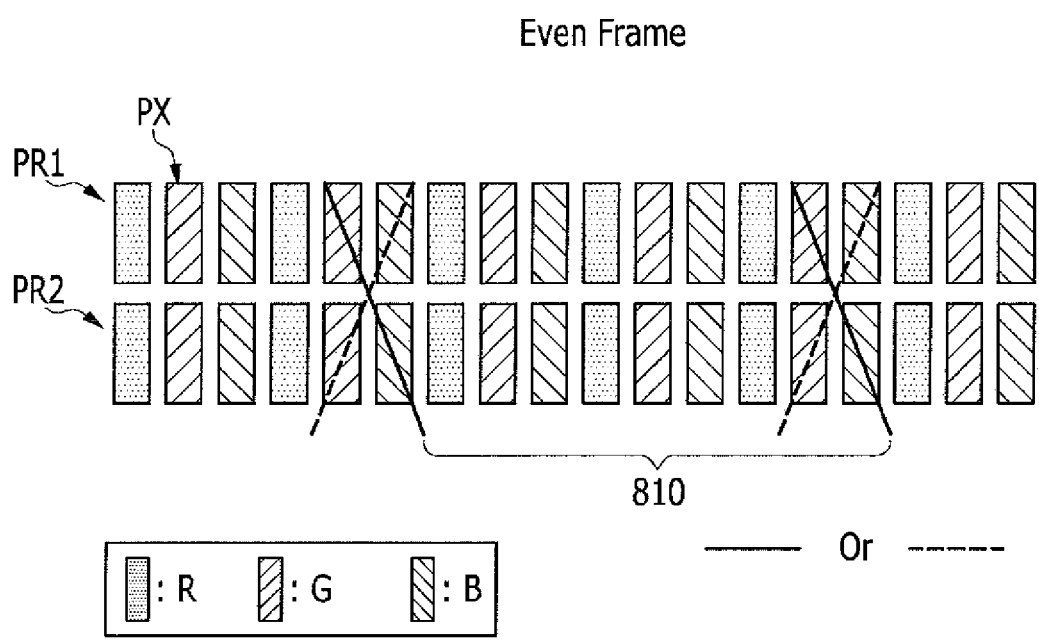

First, referring to FIGS. 19 and 20, the lenticular lens 810 marked with a solid line in FIG. 20 moves right or left by approximately ½ of the lenticular lens 810 pitch of the from the lenticular lens 810 lenticular lens 810 in an odd frame, which is the same as that of the exemplary embodiment illustrated in FIGS. 7 to 9 described above. Dot triangles illustrated in FIG. 19 represent the R, G, and B pixels of each of two dots that are formed for every 12 pixel columns for two frames with respect to a first view point VW1 according to an exemplary embodiment. In FIG. 20, the lenticular lens 810 marked with a dotted line changes its inclined direction to be opposite to the inclined direction in the previous frame while moving to the right by approximately ½ of the lenticular lens 810 pitch from the lenticular lens 810 position in the odd frame, which is the same as the exemplary embodiment illustrated in FIGS. 10 to 12 described above. The resulting dot triangle illustration is omitted.

Figure 21:
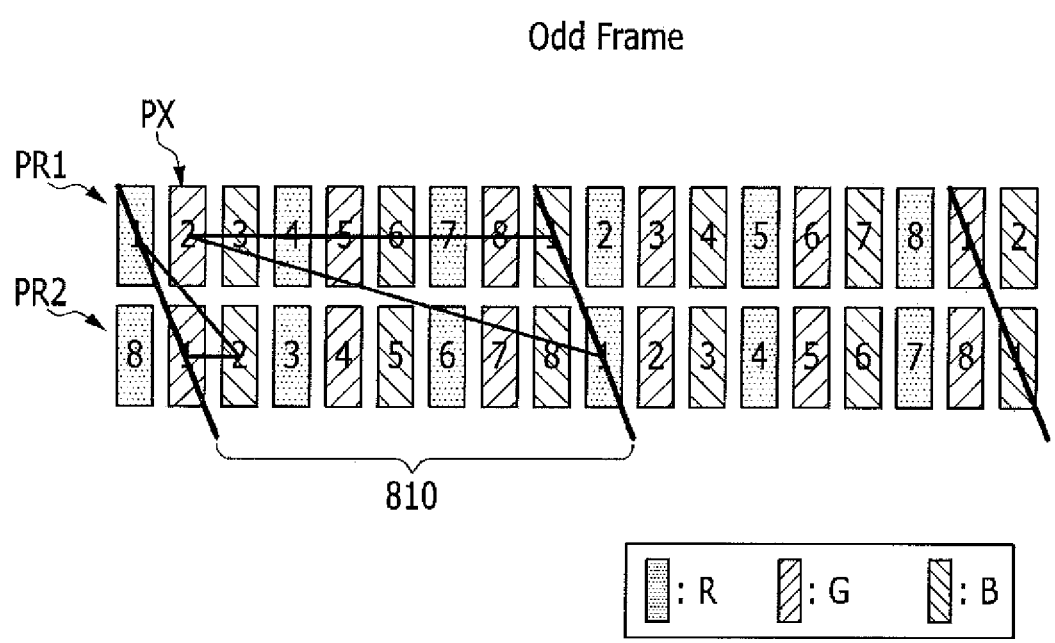
Figure 22:
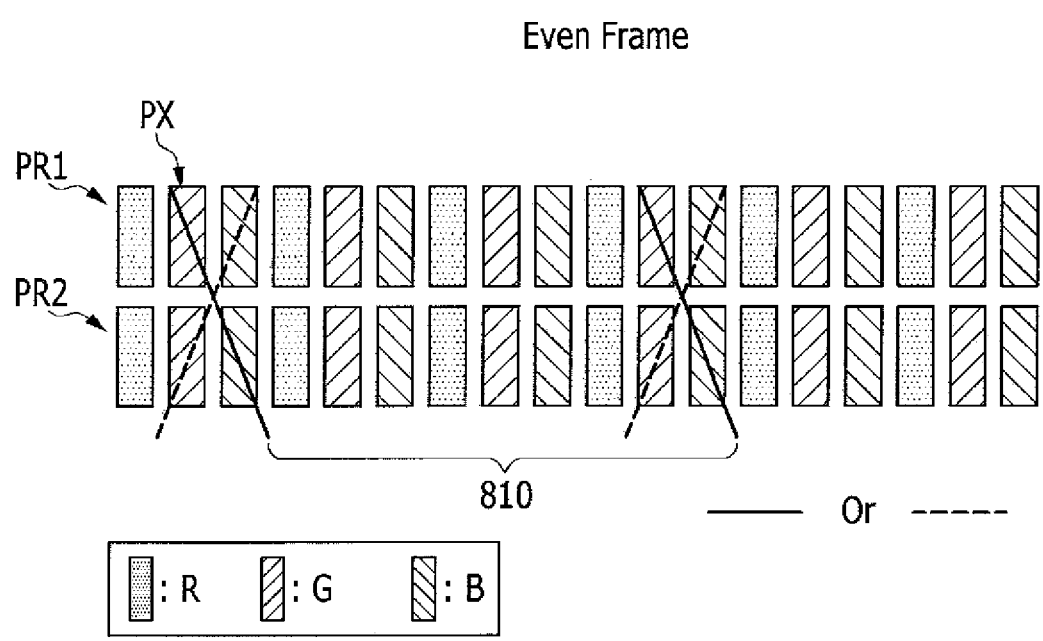

Next, referring to FIGS. 21 and 22, the lenticular lens 810 marked with a solid line of FIG. 22 moves right by approximately ⅛ of the lenticular lens 810 pitch or left by approximately ⅞ of the lenticular lens 810 pitch from the lenticular lens 810 position in the odd frame, which is the same as that of the exemplary embodiment illustrated in FIGS. 13 to 15 described above. Dot triangles illustrated in FIG. 21 represent the R, G, and B pixels of each of two dots formed in each 12 pixel columns for two frames with respect to the first view point VW1 according to the exemplary embodiment. In FIG. 22, the lenticular lens 810 marked with the dotted line changes its inclined direction to be opposite to the inclined direction in the previous frame while moving right by approximately ⅛ of the lenticular lens 810 pitch from the lenticular lens 810 position in the odd frame, which is the same as the exemplary embodiment illustrated in FIGS. 16 to 18 described above. The resulting dot triangle illustration is omitted.

Figure 23:
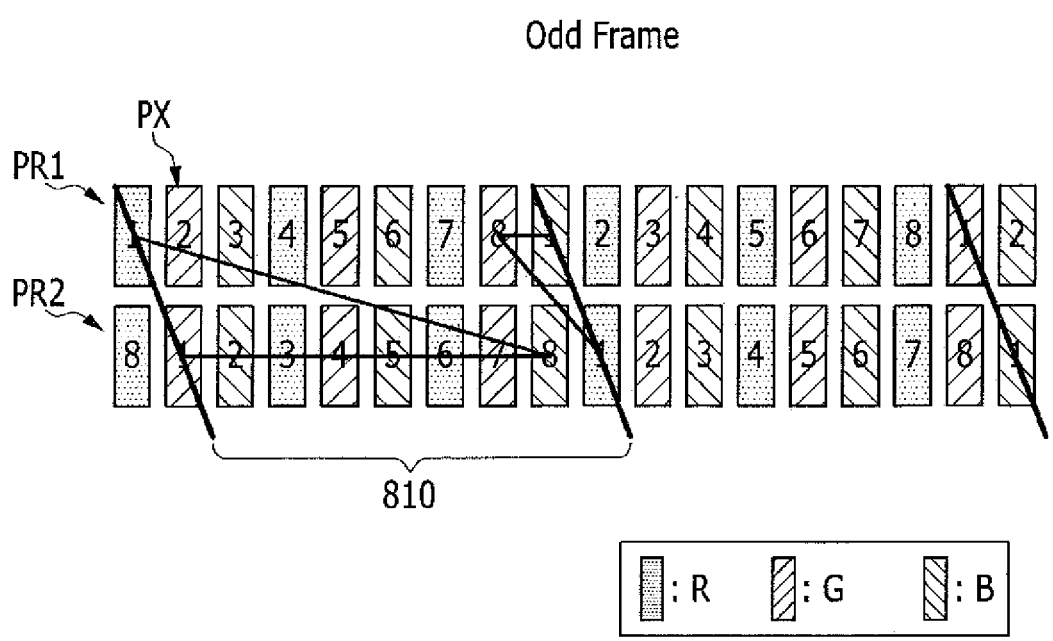
Figure 24:
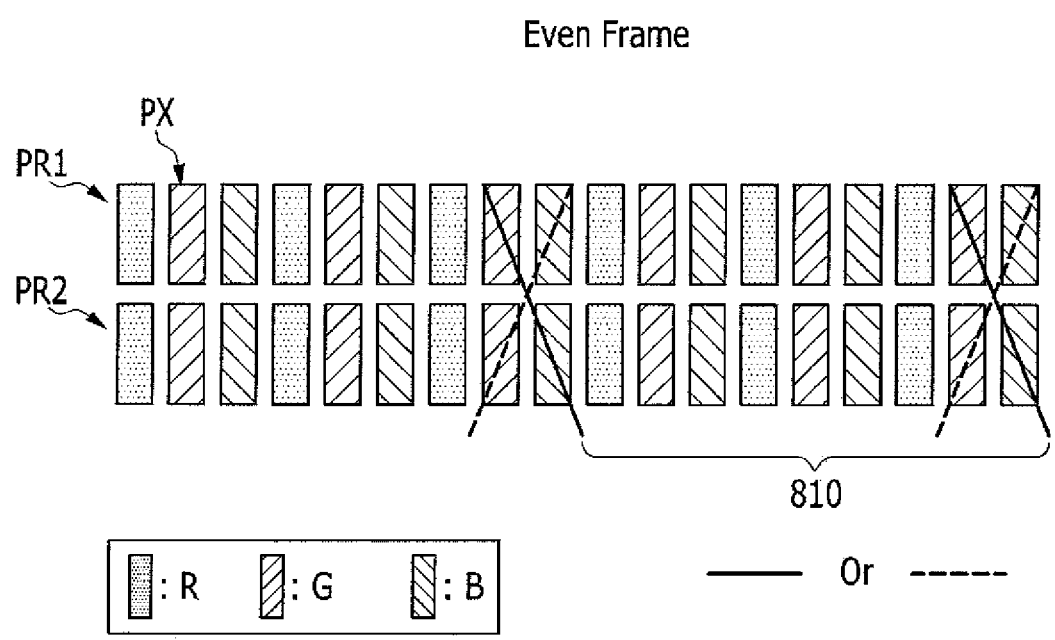

Next, referring to FIGS. 23 and 24, the lenticular lens 810 marked with the solid line of FIG. 24 may move right by approximately ⅞ of the lenticular lens 810 pitch or left by approximately ⅛ of the lenticular lens 810 pitch from the lenticular lens 810 position in the odd frame. Dot triangles illustrated in FIG. 23 illustrate the R, G, and B pixels of each of two dots formed for each 12 pixel columns for two frames with respect to the first view point VW1 according to the exemplary embodiment. While the lenticular lens 810 marked with the dotted line in FIG. 24 moves right by approximately ⅞ of the lenticular lens 810 pitch of the or left by approximately ⅛ of the lenticular lens 810 pitch from the lenticular lens 810 position in the odd frame, the inclined direction of the lenticular lens 810 may change to be opposite to the inclined direction in the previous frame. The resulting dot triangle illustration angle is omitted.

According to exemplary embodiments, when the frame changes, images of the R, G, and B dots having optimized resolution may be displayed using a time multiplexing multi-view point 3D image display device according to an exemplary embodiment of the present disclosure in accordance with movement methods and inclined directions of various lenticular lenses 810.

Next, referring to FIGS. 25 to 28, a time multiplexing multi-view point three dimensional image display device and a method of displaying a three dimensional image according to an exemplary embodiment of the present disclosure will be described in detail.

Figure 25:
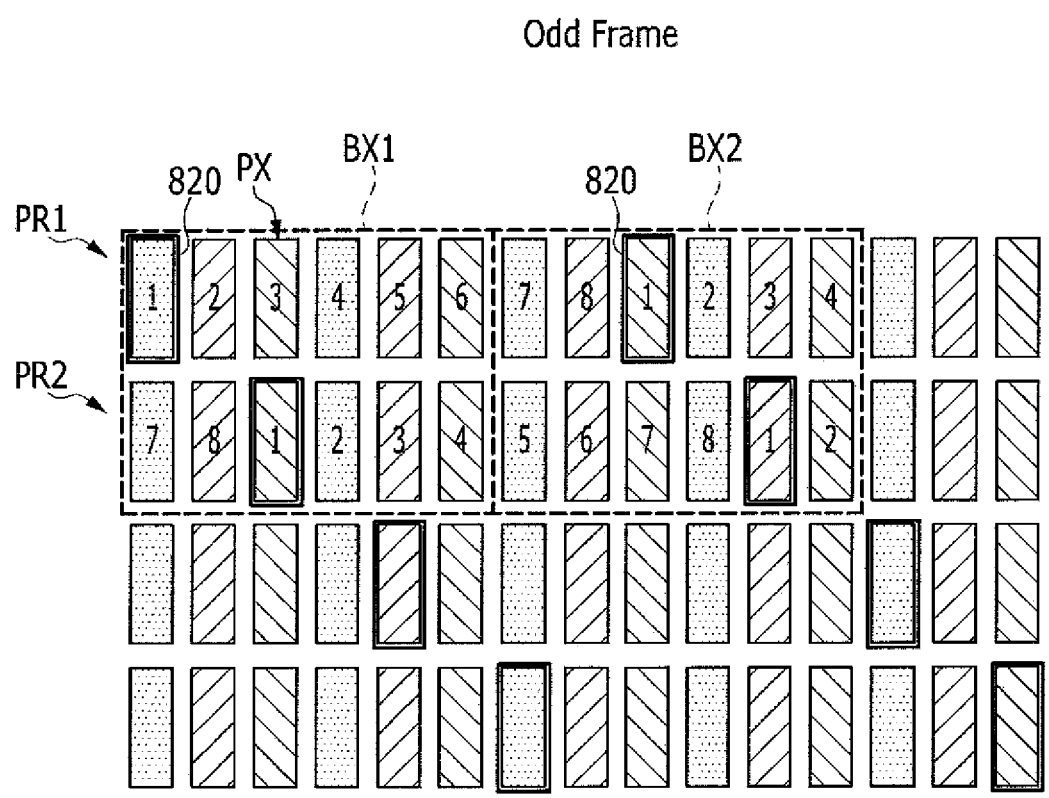
FIGS. 25 and 26 are plan views of an example of a method of displaying one 3D image for two frames by time multiplexing by means of a parallax barrier by a 3D image display device according to an exemplary embodiment of the present disclosure.
Figure 26:
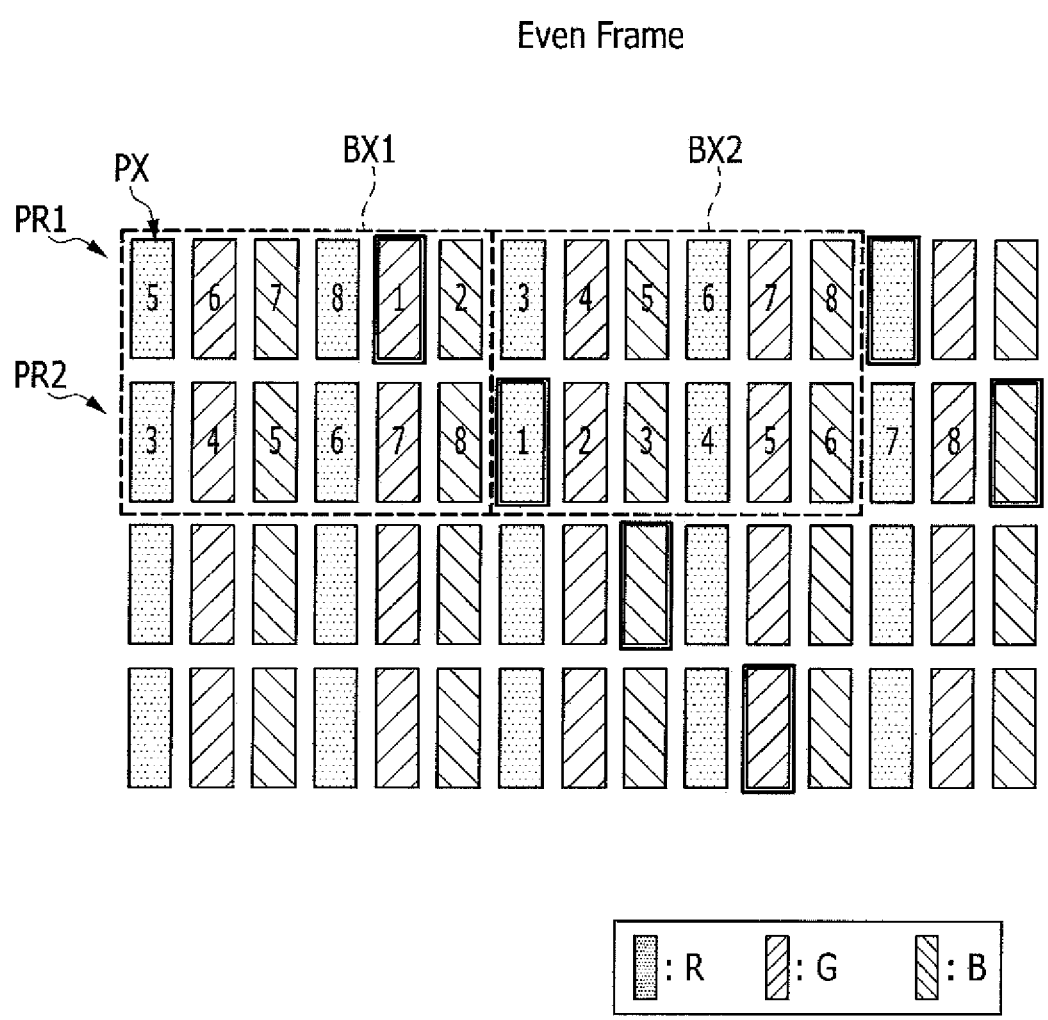
Figure 27:
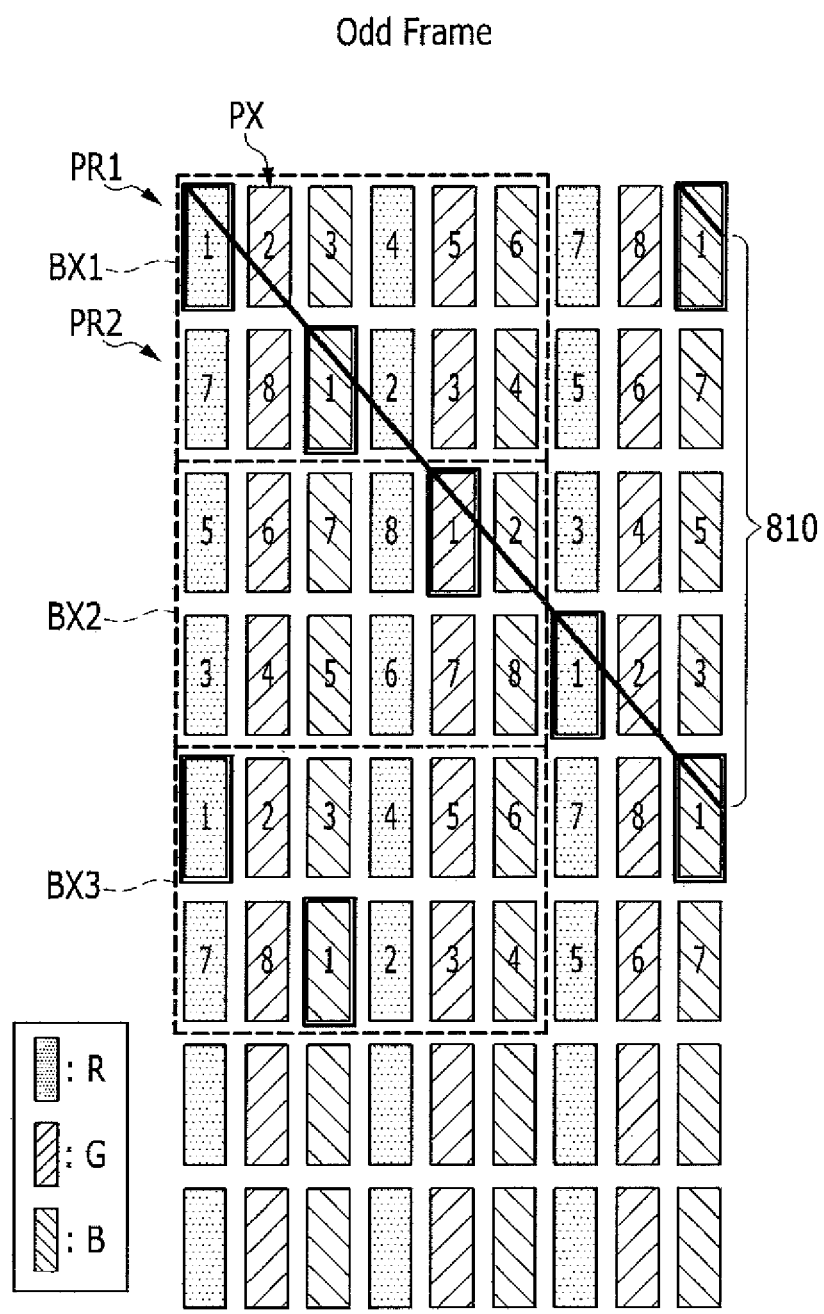
FIGS. 27 and 28 are plan views of an example of a method of displaying one 3D image for two frames by time multiplexing by means of a lenticular lens in a 3D image display device according to an exemplary embodiment of the present disclosure.
Figure 28:
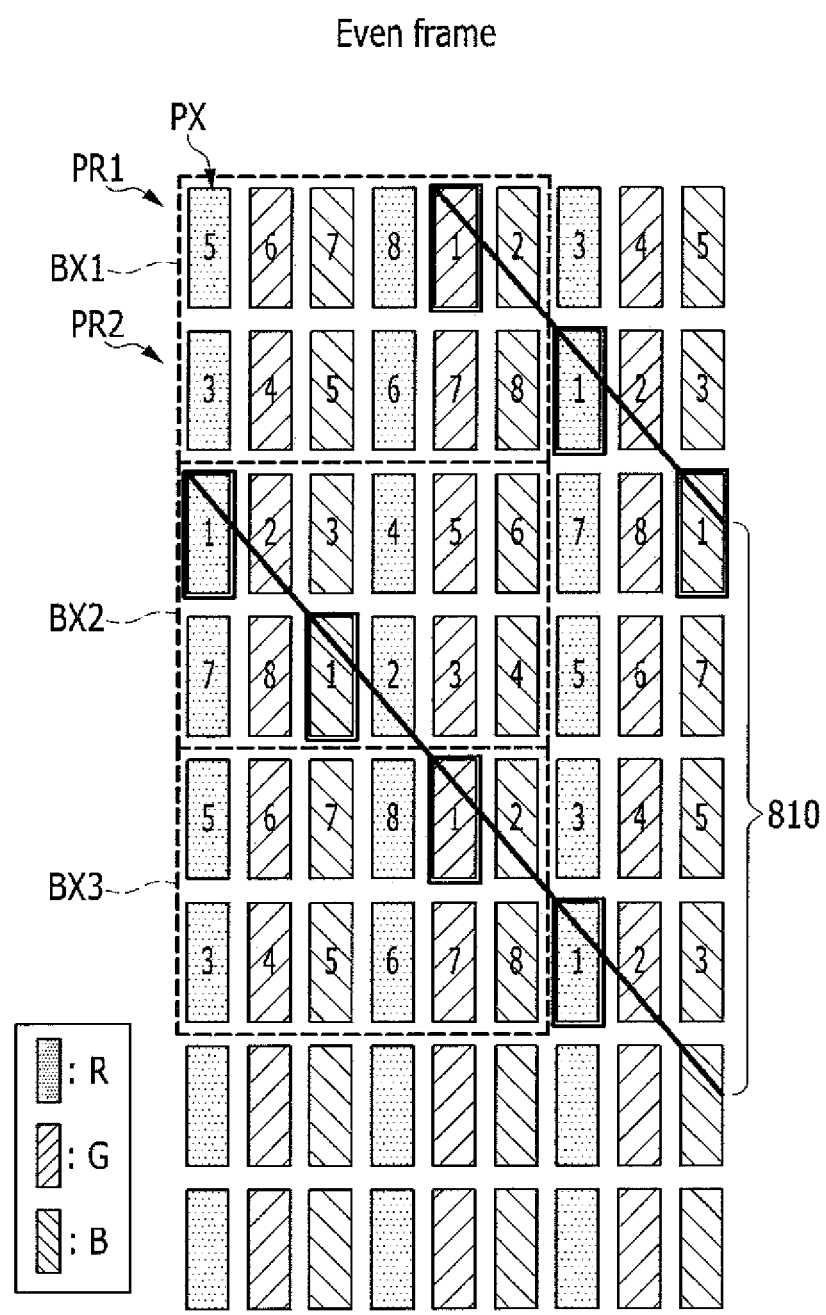

FIGS. 25 and 26 are plan views of one example of a method of displaying a 3D image for two frames by time multiplexing by means of a parallax barrier by a 3D image display device according to an exemplary embodiment of the present disclosure. FIGS. 27 and 28 are plan views of one example of a method of displaying a 3D image for two frames by time multiplexing by means of a lenticular lens by a 3D image display device according to an exemplary embodiment of the present disclosure.

First, referring to FIGS. 25 and 26, an exemplary embodiment is substantially the same as exemplary embodiments described above, but illustrates an example of displaying a multi-view point 3D image through the openings 820 of the parallax barrier instead of the lenticular lens. The openings 820 may be distributed.

Considering the first view point VW1 as an example, like the first box BX1, in the odd frame, an R pixel and a B pixel that are most adjacent to each other are selected and two pixel rows PR1 and PR2 show different primary colors, and in an even frame, a G pixel which is most adjacent to the already selected R and B pixels is selected so that two pixel rows PR1 and PR2 show the other primary colors to display a triangle for one dot for two frames.

Similarly, like the second box BX2, in the odd frame the G and B pixels that are most adjacent to each other are selected and two pixel rows PR1 and PR2 show different primary colors, and in the even frame, the R pixel which is most adjacent to the already selected G and B pixels is selected so that two pixel rows PR1 and PR2 show the other primary colors to display a triangle for one dot for two frames. Consequently, since two dots for the first view point VW1 are formed in two pixel rows PR1 and PR2 and 12 pixel columns, ½ resolution with respect to all pixels is implemented in both the longitudinal direction and the lateral direction so that an optimal resolution for displaying a 3D image may be acquired.

In an exemplary embodiment illustrated in FIGS. 25 and 26, a slope with respect to the longitudinal direction of the pixels PXs expressing one view point may be about (two pitches in the row direction of one pixel PX)/(a pitch in the column direction of one pixel PX). That is, the pixels PXs displaying one view point may be arranged along a position that shifts every two pixels in the lateral direction whenever the pixel row changes. The openings 820 of the parallax barrier may be disposed to correspond to pixels PXs displaying the same view point. However, an exemplary embodiment of the present disclosure is not limited thereto and a layout of the pixels PXs displaying the same view point and the resulting layout of the openings 820 may vary.

As such, when a parallax barrier is used as a view point division unit, the positions of the openings 820 may be more arbitrarily determined with respect to the lenticular lens 810. Further, even in exemplary embodiments using the lenticular lens 810 described above or to be described below, a parallax barrier that includes the openings 820 disposed along the inclination of the lenticular lens 810 may be used instead of the lenticular lens 810.

Referring to FIGS. 27 and 28, an exemplary embodiment is substantially the same as an exemplary embodiment illustrated in FIGS. 25 and 26 described above, but illustrate an example of displaying the 3D image using an inclined lenticular lens 810 instead of the parallax barrier. In this case, the slope of the lenticular lens 810 with respect to the longitudinal direction may be (two pitches in the row direction of one pixel PX)/(a pitch in the column direction of one pixel PX). Considering the first view point VW1, an image of one dot including each of the R, G, and B pixels may be displayed for two frames in each of the first box BX1, the second box BX2, and the third box BX3.

Hereinafter, referring to FIGS. 29 to 38 in addition to exemplary embodiments described above, a time multiplexing multi-view point three dimensional image display device and a method of displaying a three dimensional image according to an exemplary embodiment of the present disclosure will be described in detail.

Figure 29:
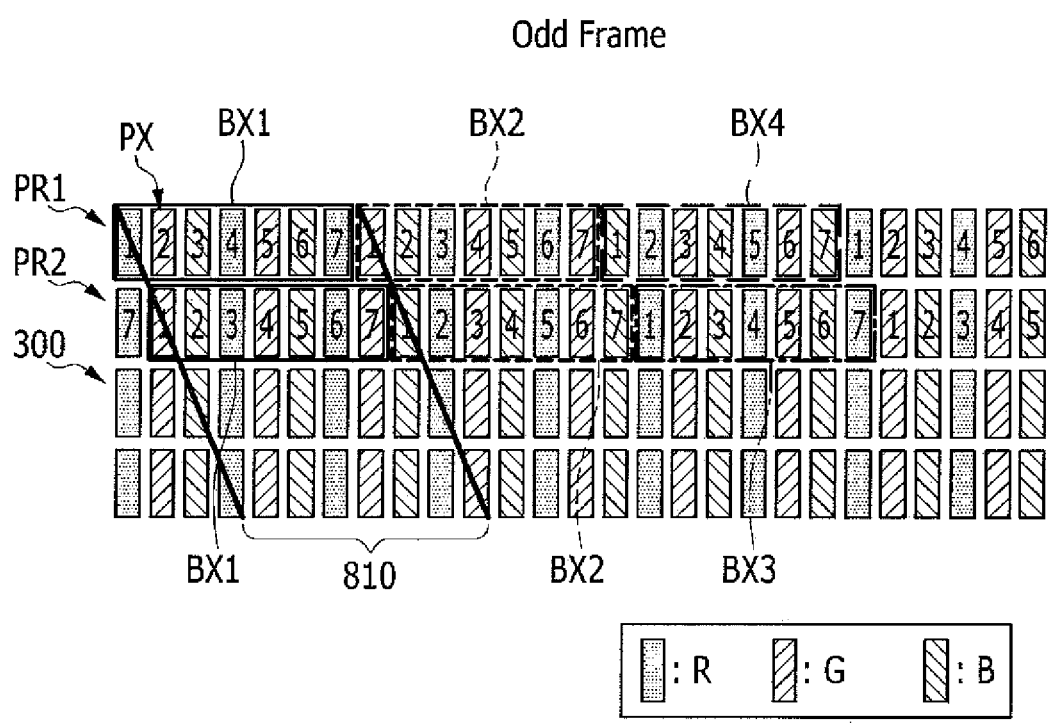
FIGS. 29 and 30 are plan views of one example of a method of displaying one 3D image for two frames by time multiplexing by a 3D image display device according to an exemplary embodiment of the present disclosure.
Figure 30:
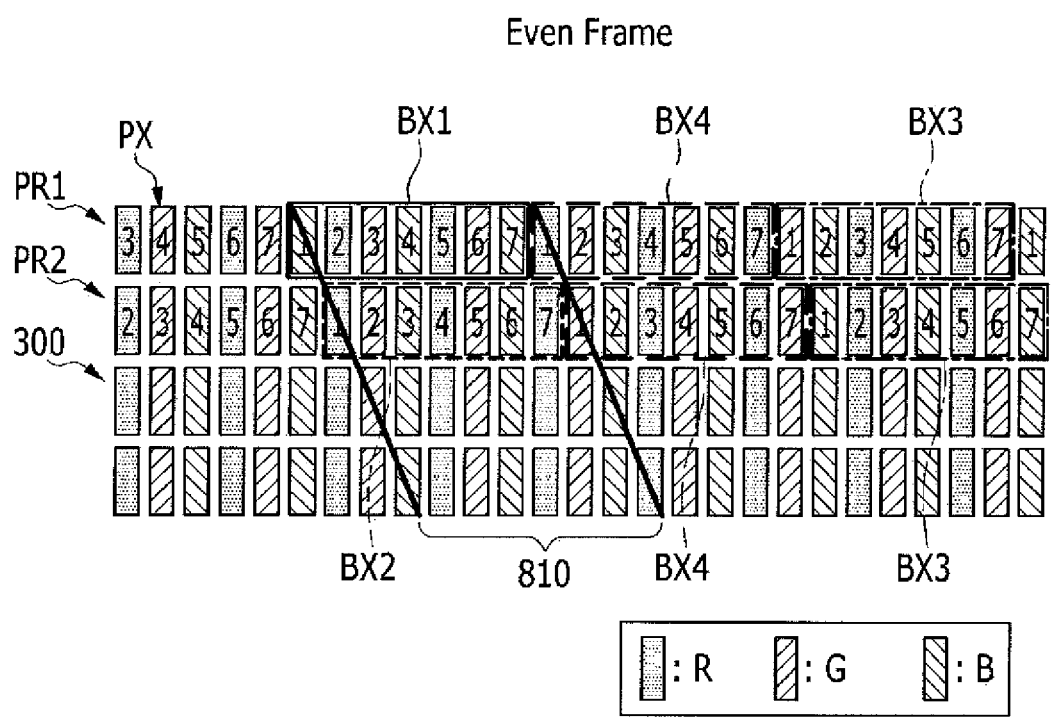
Figure 31:
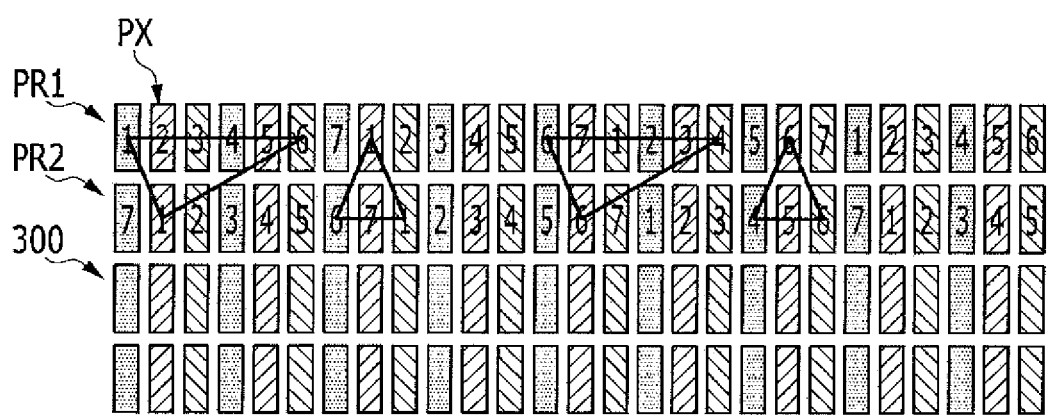
FIG. 31 is a plan view of the position of a pixel showing primary colors constituting one dot of an image observed in one view point for two frames when a 3D image is displayed by the method illustrated in FIGS. 29 and 30.
Figure 31:
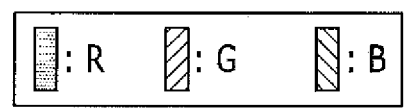
Figure 32:
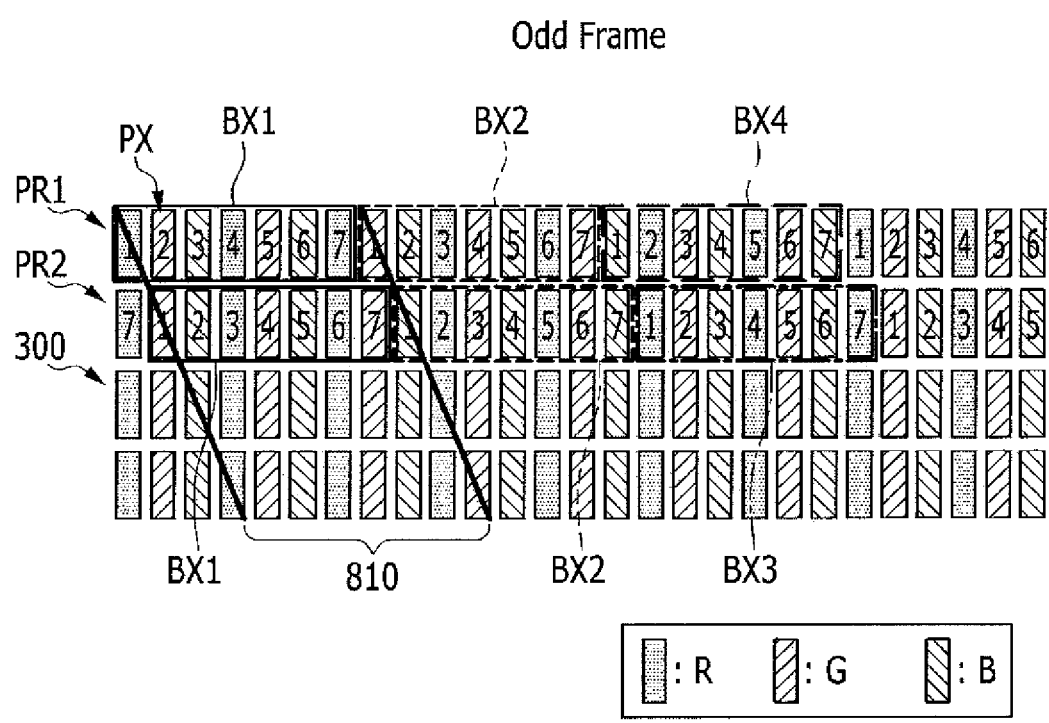
FIGS. 32 and 33 are plan views of an example of a method of displaying one 3D image for two frames by time multiplexing by a 3D image display device according to an exemplary embodiment of the present disclosure.
Figure 33:
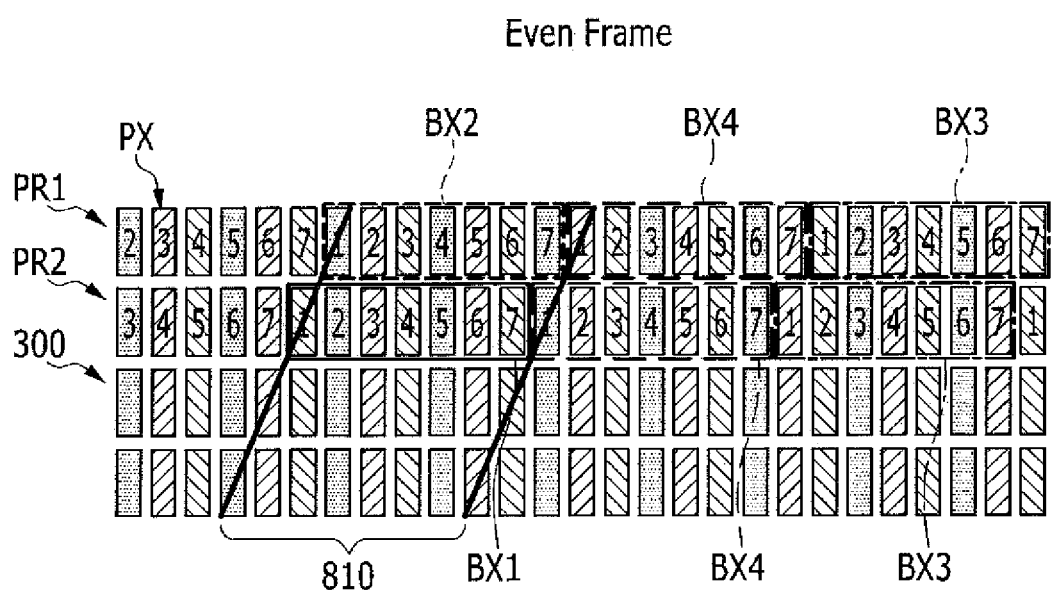
Figure 34:
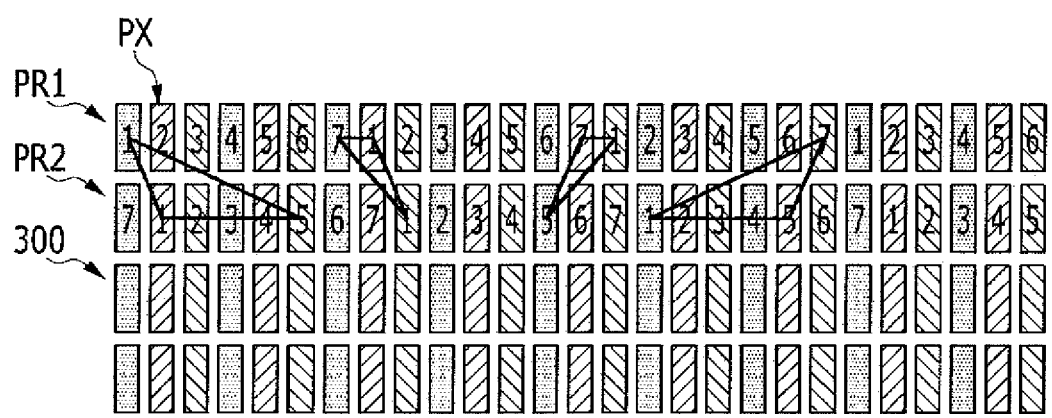
FIG. 34 is a plan view of the position of a pixel showing primary colors constituting one dot of an image observed in one view point for two frames when a 3D image is displayed by the method illustrated in FIGS. 32 and 33.
Figure 34:
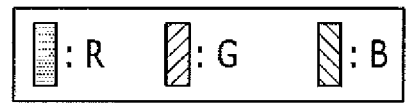

FIGS. 29 and 30 are plan views of an example of a method of displaying a 3D image for two frames by time multiplexing by a 3D image display device according to an exemplary embodiment of the present disclosure. FIG. 31 is a plan view of the position of a pixel showing primary colors constituting one dot of an image observed in one view point for two frames when a 3D image is displayed by a method illustrated in FIGS. 29 and 30. FIGS. 32 and 33 are plan views of an example of a method of displaying a 3D image for two frames by time multiplexing by a 3D image display device according to an exemplary embodiment of the present disclosure. FIG. 34 is a plan view illustrating the position of a pixel showing primary colors constituting one dot of an image observed in one view point for two frames when a 3D image is displayed by a method illustrated in FIGS. 32 and 33. FIGS. 35 and 36, and FIGS. 38 and 39 are plan views of an example of a method in which a three dimensional image display device according to an exemplary embodiment of the present disclosure displays a 3D image by time multiplexing for two frames, and the primary color pixel positions of one image dot are observed in one view point for two frames, respectively.

First, referring to FIGS. 29 to 31, an exemplary embodiment is substantially the same as an exemplary embodiment illustrated in FIGS. 7 to 9 described above, but illustrate an example in which a three dimensional display device displays an image with seven view points rather than eight view points. Therefore, pixels PXs corresponding to the seven view points are periodically arranged in each pixel row.

Referring to FIGS. 29 and 30, in the odd frame, the first to seventh pixels that display respective 3D images corresponding to the first to seventh view points may, in the even frame, display respective 3D images corresponding to the third to seventh view points and the first to third view points. In this case, the lenticular lens 810 may move right by approximately 5/7 of the lenticular lens 810 pitch or left by approximately 2/7 of the lenticular lens 810 pitch when the frame changes. Considering the first view point VW1, the R, G, and B pixels PXs dots displaying the first view point VW1 for two frames may form triangles as illustrated in FIG. 31. Pixels PXs having three primary colors constituting one dot with respect to one view point may be selected for each of the boxes BX1, BX2, BX3, and BX4. As such, according to an exemplary embodiment, one dot of a 3D image is configured for a plurality of frames of one frame set. Further, since two dots are configured for two pixel rows PR1 and PR2 and 12 pixel columns, approximately ½ resolution with respect to all pixels may be implemented in both the lateral direction and the longitudinal direction.

Next, referring to FIGS. 32 to 34, an exemplary embodiment is substantially the same as an exemplary embodiment illustrated in FIGS. 29 to 31, but illustrate how when the frame changes, the inclined direction of the lenticular lens 810 with respect to the longitudinal direction may change to be opposite to the inclined direction in the previous frame. Further, when the frame changes, the lenticular lens 810 may move right by approximately 5/7 of one lenticular lens 810 pitch or left by approximately 2/7 of one lenticular lens 810 pitch, as in an exemplary embodiment illustrated in FIGS. 29 to 31 when viewed based on two pixel rows PR1 and PR2.

FIGS. 35 to 38 illustrate examples of a method of how the movement distances and the inclined directions of various lenticular lenses 810 change depending on the frame, which include the examples illustrated in FIGS. 29 to 34 described above in the case of displaying a 3D image with seven view points.

Figure 35:
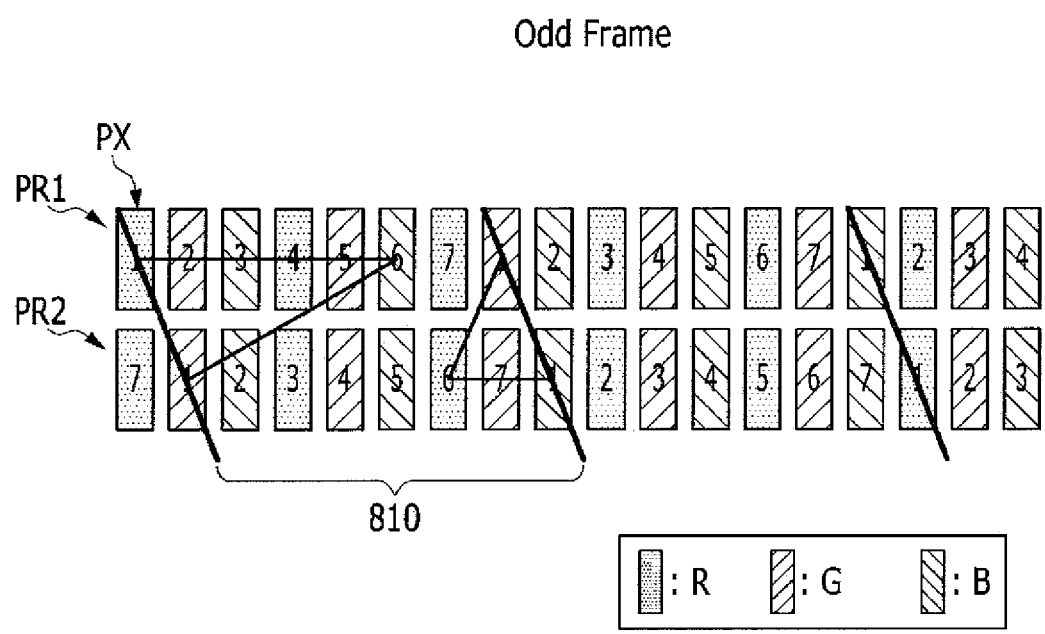
FIGS. 35 and 36, FIGS. 37 and 38, FIGS. 39 and 40, and FIGS. 41 and 42 are plan views of one example of a method in which a three dimensional image display device according to an exemplary embodiment of the present disclosure displays one 3D image by time multiplexing for two frames, and the primary color pixel positions of one dot of an image observed in one view point for two frames, respectively.
Figure 36:
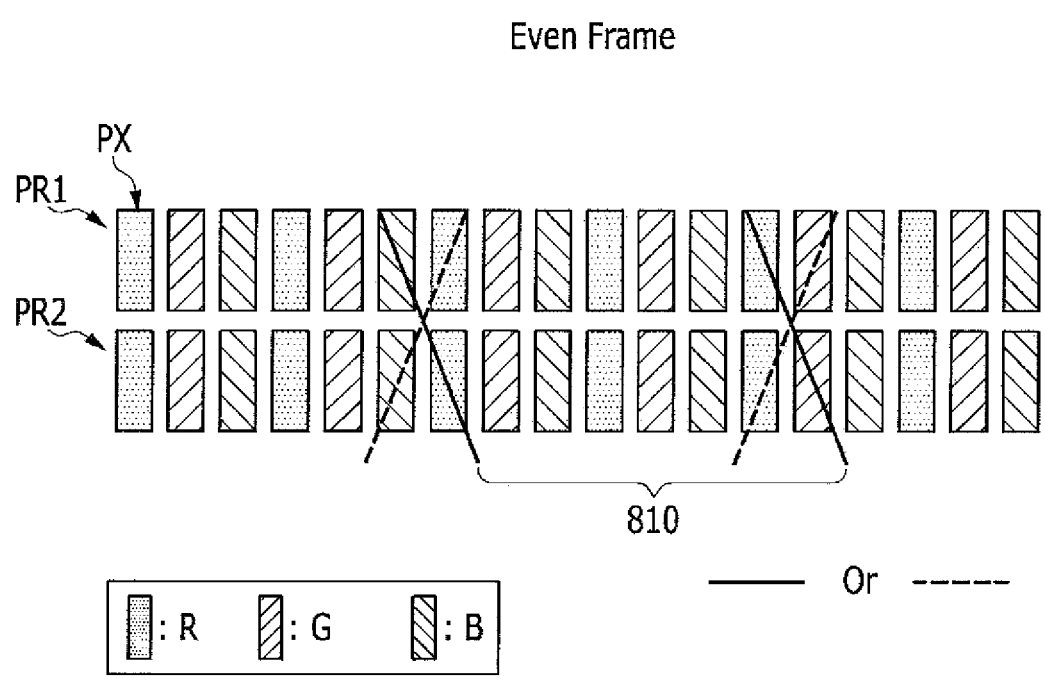

First, referring to FIGS. 35 and 36, the lenticular lens 810 marked with a solid line of FIG. 36 moves right by approximately 5/7 of the lenticular lens 810 pitch or left by approximately 2/7 of the lenticular lens 810 from the lenticular lens 810 position in the odd frame, which is the same as that of an exemplary embodiment illustrated in FIGS. 29 to 31 described above. Dot triangles illustrated in FIG. 35 represent R, G, and B pixels of each of two dots with respect to the first view point VW1 formed for every 12 pixel columns for two frames according to an exemplary embodiment. In FIG. 36, in the odd frame, the lenticular lens 810 marked with the dotted line changes its inclined direction to be opposite to the inclined direction in the previous frame while moving right by approximately 5/7 of the lenticular lens 810 pitch or left by approximately 2/7 of the lenticular lens 810 from the lenticular lens 810 position, which is the same as an exemplary embodiment illustrated in FIGS. 32 to 34 described above. The resulting dot triangle illustration is omitted.

Figure 37:
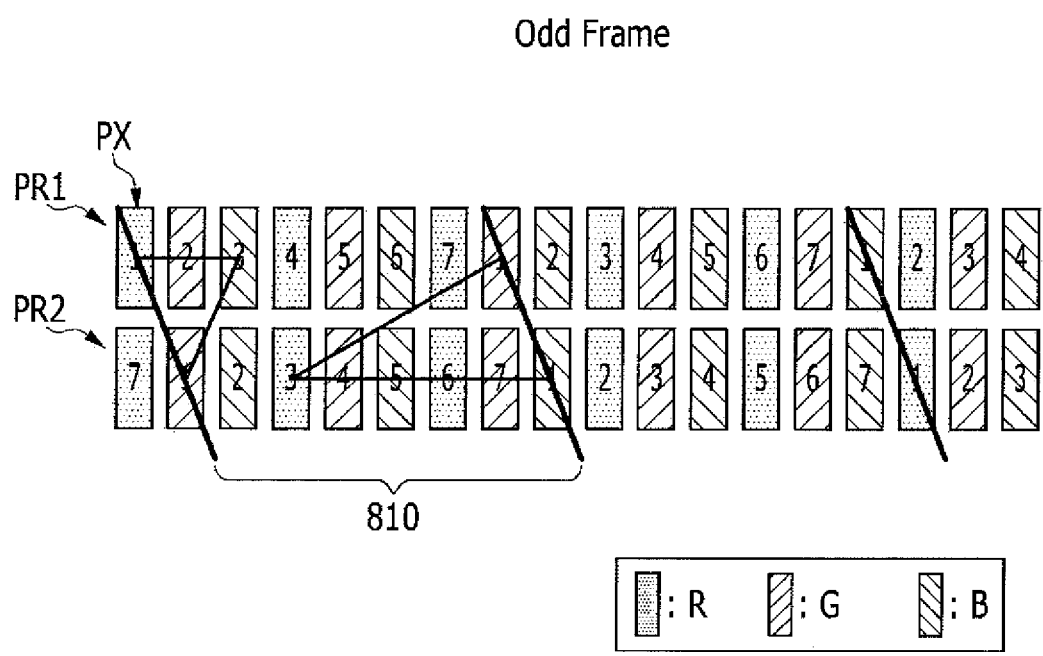
Figure 38:
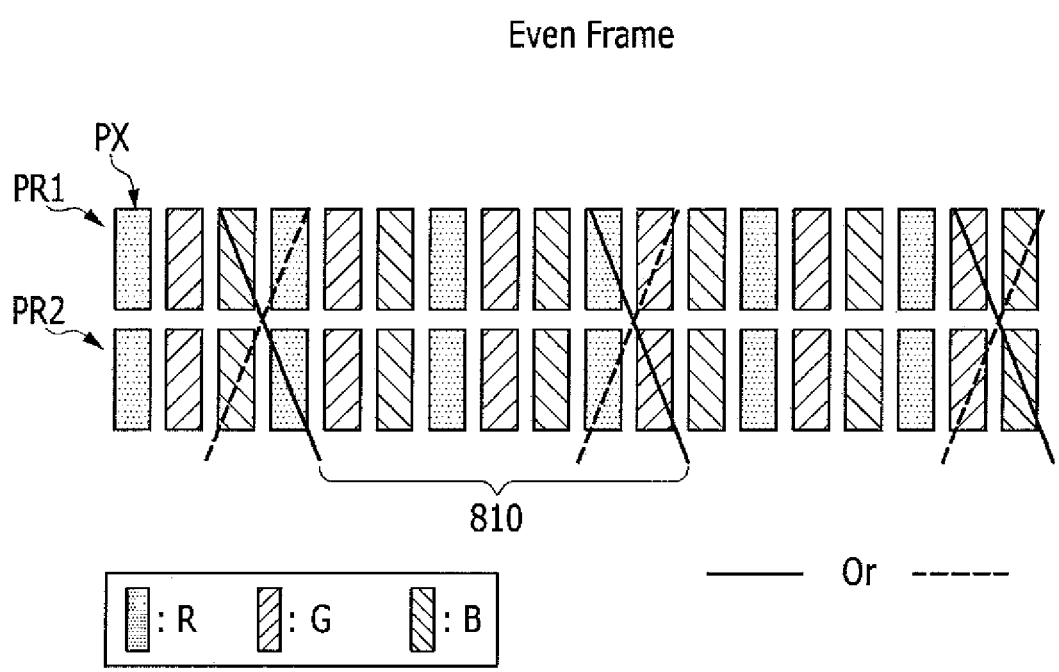

Next, referring to FIGS. 37 and 38, the lenticular lens 810 marked with the solid line of FIG. 38 may move right by approximately 2/7 of the lenticular lens 810 pitch or left by approximately 5/7 of the lenticular lens 810 pitch from the lenticular lens 810 position in the odd frame. Dot triangles illustrated in FIG. 37 represent R, G, and B pixels of each of two dots formed over 12 pixel columns for two frames with respect to the first view point VW1 according to an exemplary embodiment. While the lenticular lens 810 marked with the dotted line in FIG. 38 moves right by approximately 2/7 of the lenticular lens 810 pitch or left by approximately 5/7 of the lenticular lens 810 pitch from the lenticular lens 810 position in the odd frame, the inclined direction of the lenticular lens 810 may change to be opposite to the inclined direction in the previous frame. The resulting dot triangle illustration is omitted.

Hereinafter, referring to FIGS. 39 to 42 in addition to several exemplary embodiments described above, a time multiplexing multi-view point three dimensional image display device and a method of displaying a three dimensional image according to an exemplary embodiment of the present disclosure will be described in detail.

FIGS. 39 and 40, and FIGS. 41 and 42 are plan views of an example of a method in which a three dimensional image display device according to an exemplary embodiment of the present disclosure displays a 3D image by time multiplexing for two frames, and the primary color pixel positions of one image dot are observed from one view point for two frames, respectively.

An exemplary embodiment is substantially the same as exemplary embodiments described above, but illustrates an example in which a three dimensional image display device displays an image with five view points. Therefore, pixels PXs displaying the image corresponding to five view points are periodically arranged in each pixel row.

Figure 39:
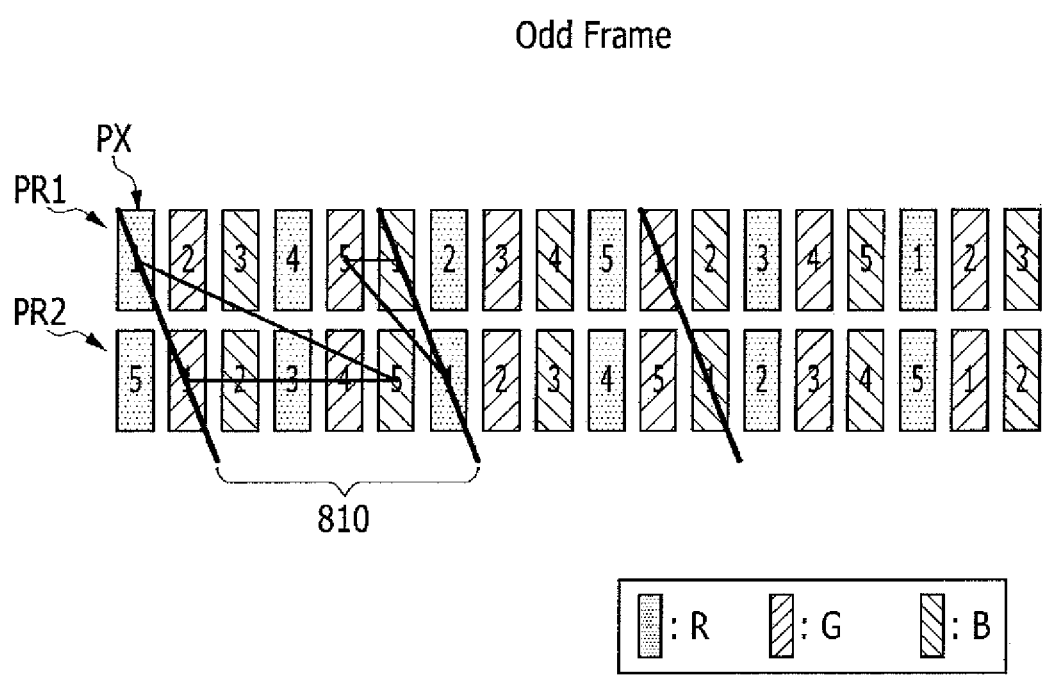
Figure 40:
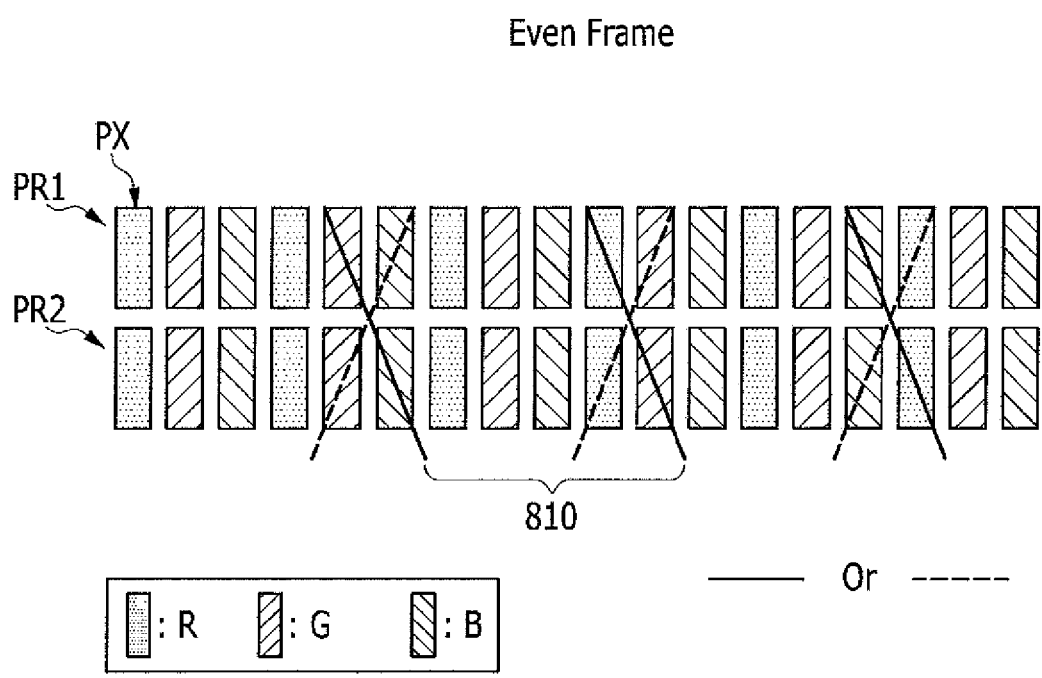

First, referring to FIGS. 39 and 40, in an odd frame, the first to fifth pixels displaying respective 3D images corresponding to the first to fifth view points may, in the even frame, display respective 3D images corresponding to the second to fifth view points and the first view point.

The lenticular lens 810 marked with the solid line of FIG. 40 may move right by approximately ⅘ of the lenticular lens 810 pitch or left by approximately ⅕ of the lenticular lens 810 pitch from the lenticular lens 810 position in the odd frame. Dot triangles illustrated in FIG. 39 represent R, G, and B pixels of each of two dots formed over 9 pixel columns for two frames with respect to the first view point VW1 according to an exemplary embodiment. While the lenticular lens 810 marked with the dotted line in FIG. 40 moves right by approximately ⅘ of the lenticular lens 810 pitch of the lenticular lens 810 or left by approximately ⅕ of the lenticular lens 810 pitch from the lenticular lens 810 position in the odd frame, the inclined direction of the lenticular lens 810 change to be opposite to the inclined direction in the previous frame. The resulting dot triangle illustration is omitted.

Figure 41:
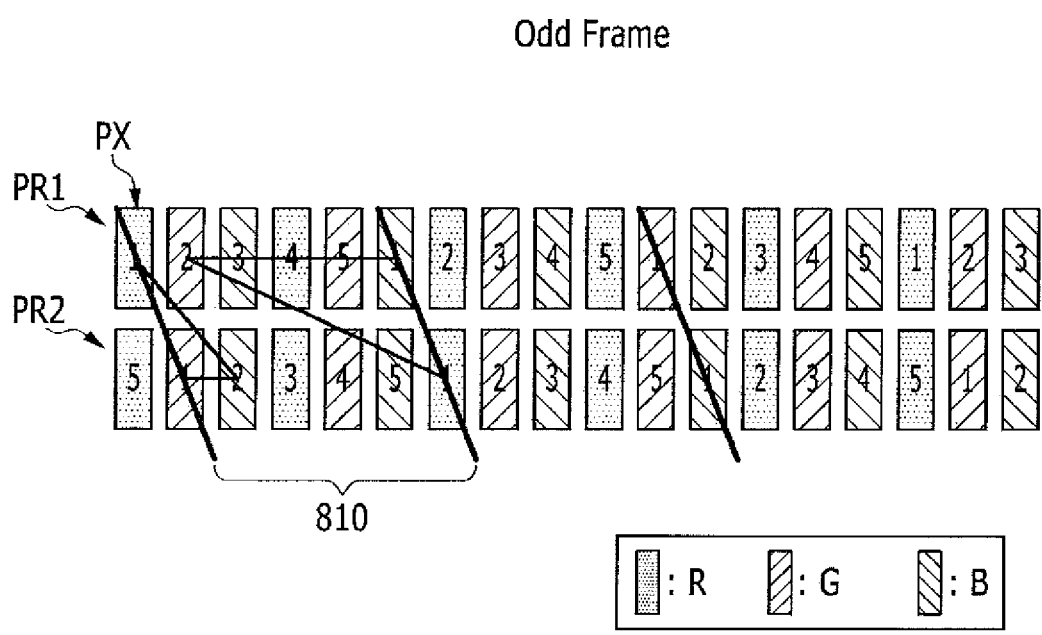
Figure 42:
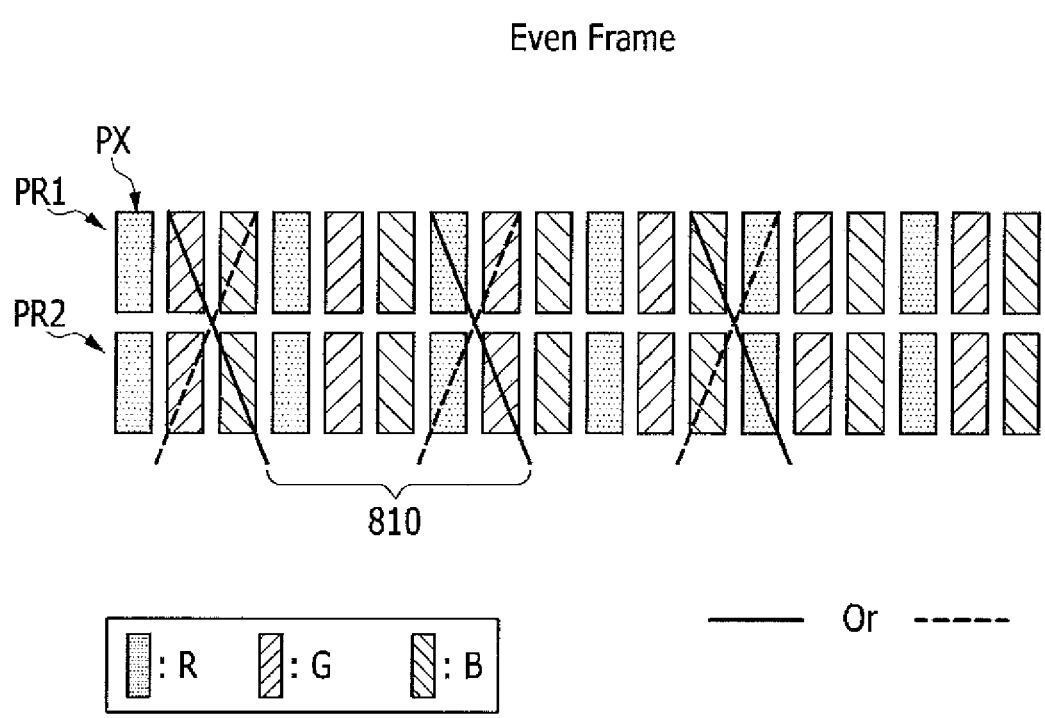

Next, referring to FIGS. 41 and 42, in an odd frame, the first to fifth pixels displaying respective 3D images corresponding to the first to fifth view points may, in the even frame, display respective 3D images corresponding to the fifth view point and the first to fourth view points.

The lenticular lens 810 marked with the solid line of FIG. 42 may move right by approximately ⅕ of the lenticular lens 810 pitch or left by approximately ⅘ of the lenticular lens 810 pitch from the lenticular lens 810 position in the odd frame. Dot triangles of dots illustrated in FIG. 41 represent R, G, and B pixels of each of two dots formed over 9 pixel columns for two frames with respect to the first view point VW1 according to an exemplary embodiment. While the lenticular lens 810 marked with the dotted line in FIG. 42 moves right by approximately ⅕ of the lenticular lens 810 pitch or left by approximately ⅘ of the lenticular lens 810 pitch from the lenticular lens 810 position in the odd frame, the inclined direction of the lenticular lens 810 may change to be opposite to the inclined direction in the previous frame. The resulting dot triangle illustration is omitted.

According to an exemplary embodiment, since two dots are configured for two pixel rows PR1 and PR2, and 9 pixel columns, approximately ⅔ resolution with respect to all pixels in the lateral direction and approximately ½ resolution with respect to all pixels in the longitudinal direction may be implemented.

Hereinafter, referring to FIGS. 43 and 44 in addition to exemplary embodiments described above, a time multiplexing multi-view point three dimensional image display device and a method of displaying a three dimensional image according to an exemplary embodiment of the present disclosure will be described in detail.

Figure 43:
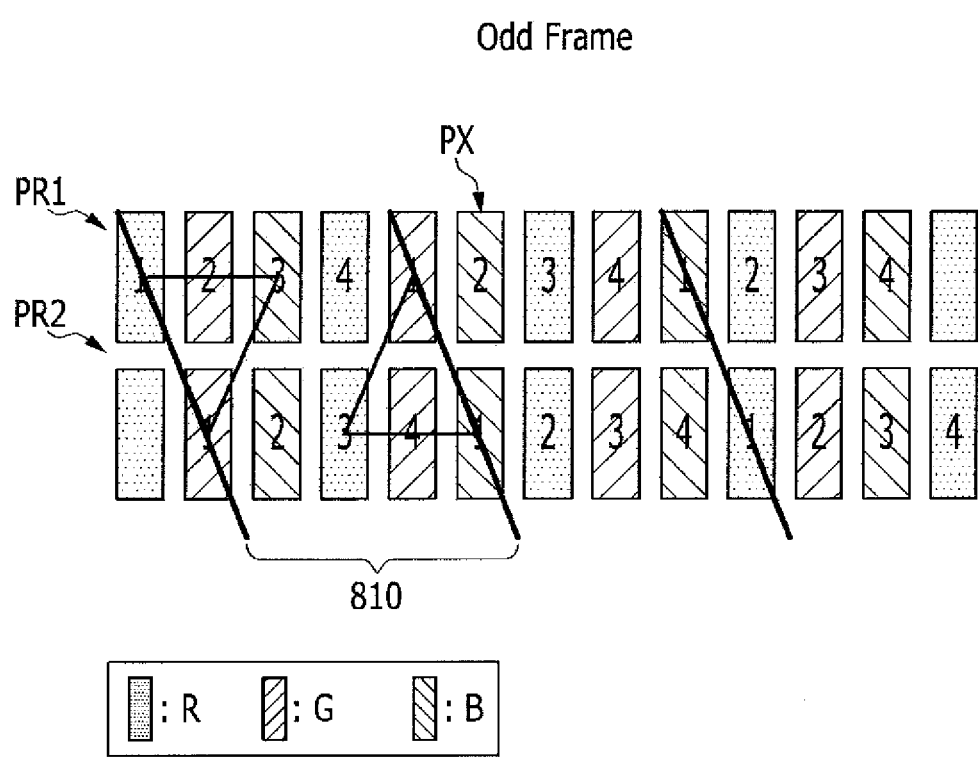
FIGS. 43 and 44 are plan views of an example of a method in which a three dimensional image display device displays a 3D image by time multiplexing for two frames, and the primary color pixel positions for one image dot are observed in one view point for two frames, according to an exemplary embodiment of the present disclosure.
Figure 44:
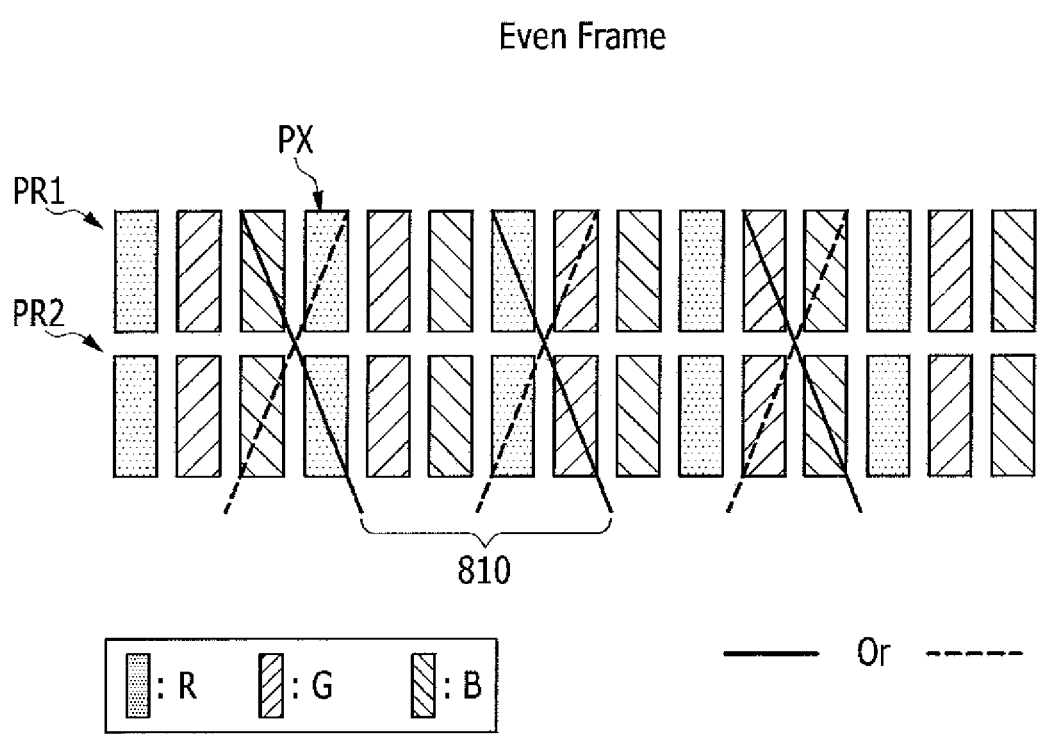

FIGS. 43 and 44 are plan views of an example of a method in which a three dimensional image display device according to an exemplary embodiment of the present disclosure displays a 3D image by time multiplexing for two frames, and the primary color pixel positions for one image dot are observed in one view point for two frames.

An exemplary embodiment is substantially the same as exemplary embodiments described above, but illustrates an example in which a three dimensional image display device displays an image of 4 view points. Therefore, pixels PXs displaying an image corresponding to four view points are periodically arranged in each pixel row.

Referring to FIGS. 43 and 44, in an odd frame, the first to fourth pixels displaying respective 3D images corresponding to the first to fourth view points may, in the even frame, display respective 3D images corresponding to the third and fourth view points, and the first and second view points.

The lenticular lens 810 marked with the solid line of FIG. 44 may move right or left by approximately ½ of the lenticular lens 810 pitch from the lenticular lens 810 position in the odd frame. Dot triangles illustrated in FIG. 43 represent R, G, and B pixels of each of two dots formed over 6 pixel columns for two frames with respect to the first view point VW1 according to an exemplary embodiment. While the lenticular lens 810 marked with the dotted line in FIG. 44 moves right or left by approximately 1/1 of the lenticular lens 810 pitch from the lenticular lens 810 position in the odd frame, the inclined direction of the lenticular lens 810 may change to be opposite to the inclined direction in the previous frame. The resulting dot triangle illustration is omitted.

According to an exemplary embodiment, since two dots are configured for two pixel rows PR1 and PR2 and 6 pixel columns, approximately 1/1 resolution with respect to all pixels in the lateral direction and approximately ½ resolution with respect to all pixels in the longitudinal direction may be implemented.

As such, when a time multiplexing multi-view point three dimensional image display device according to an exemplary embodiment of the present disclosure displays three primary colors, such as R, G, and B, a time multiplexing multi-view point three dimensional image display device may display images in various view points. However, the number of view points n may not be a multiple of 3.

Next, referring to FIG. 45, a time multiplexing multi-view point three dimensional image display device and a method of displaying a three dimensional image according to an exemplary embodiment of the present disclosure will be described.

Figure 45:
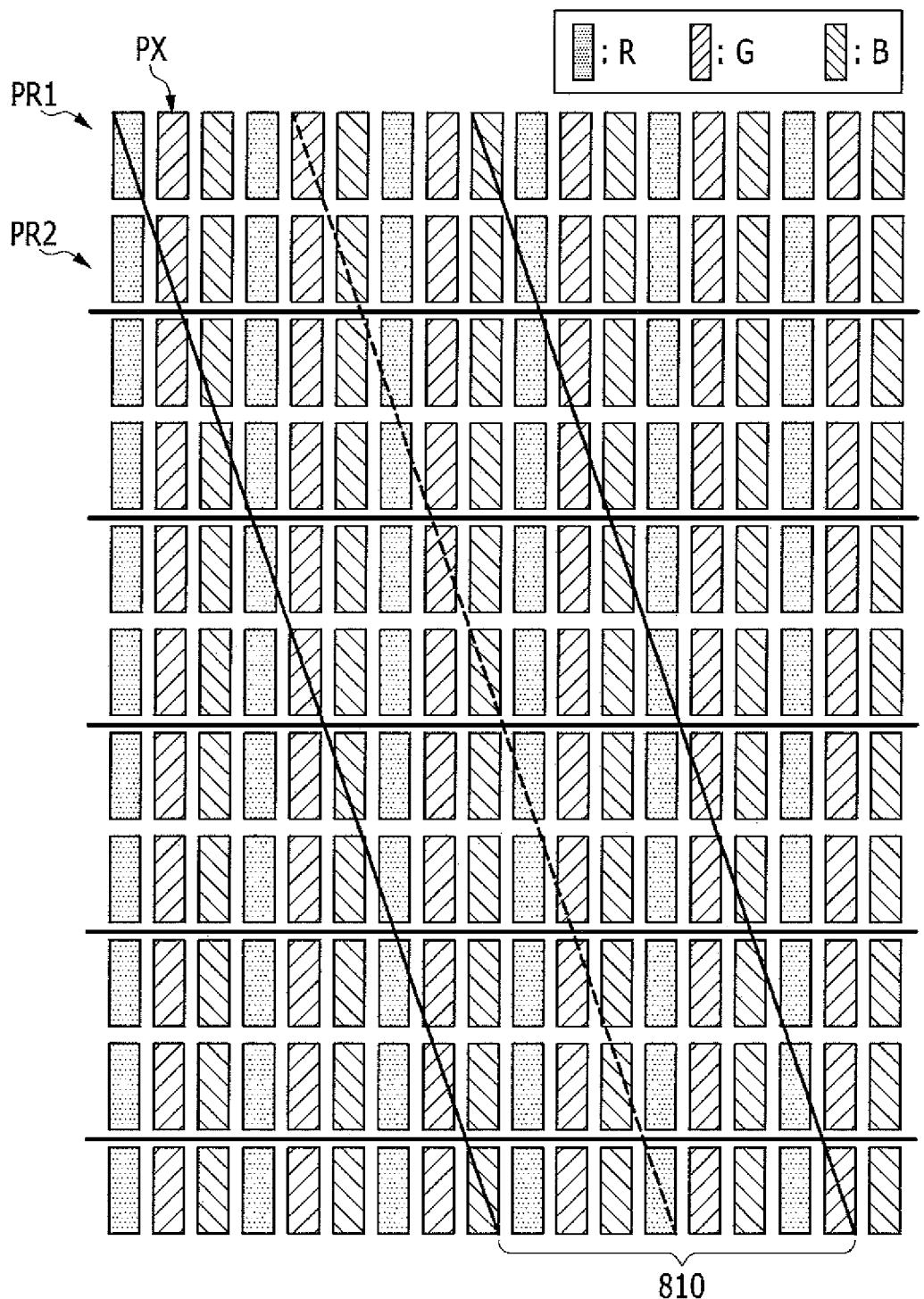
FIG. 45 is a plan view of an example of a method in which a 3D image display device according to an exemplary embodiment of the present disclosure displays one 3D image for two frames by time multiplexing.

FIG. 45 is a plan view of an example of a method in which a 3D image display device according to an exemplary embodiment of the present disclosure displays a 3D image for two frames by time multiplexing.

Referring to FIG. 45, an exemplary embodiment is substantially the same as exemplary embodiments described above, but illustrates how to determine a slope of the lenticular lens 810 included in a three dimensional image display device according to an exemplary embodiment of the present disclosure. In this case, start positions of two pixel rows PR1 and PR2 may be adjusted in accordance with the inclination slope of the lenticular lens 810. In FIG. 45, the lenticular lens 810 slope with respect to the longitudinal direction may be approximately (nine pitches in the row direction of one pixel PX)/(eleven pitches in the column direction of one pixel PX). As such, generation of patterns such as moiré patterns, etc., by interference between the display panel 300 and the lenticular lens 810 may be reduced by maximizing a spatial period of an extended line of the inclined direction of the lenticular lens 810 to an apex of the pixel PX.

Next, referring to FIGS. 46 and 47, a time multiplexing multi-view point three dimensional image display device and a method of displaying a three dimensional image according to an exemplary embodiment of the present disclosure will be described.

Figure 46:
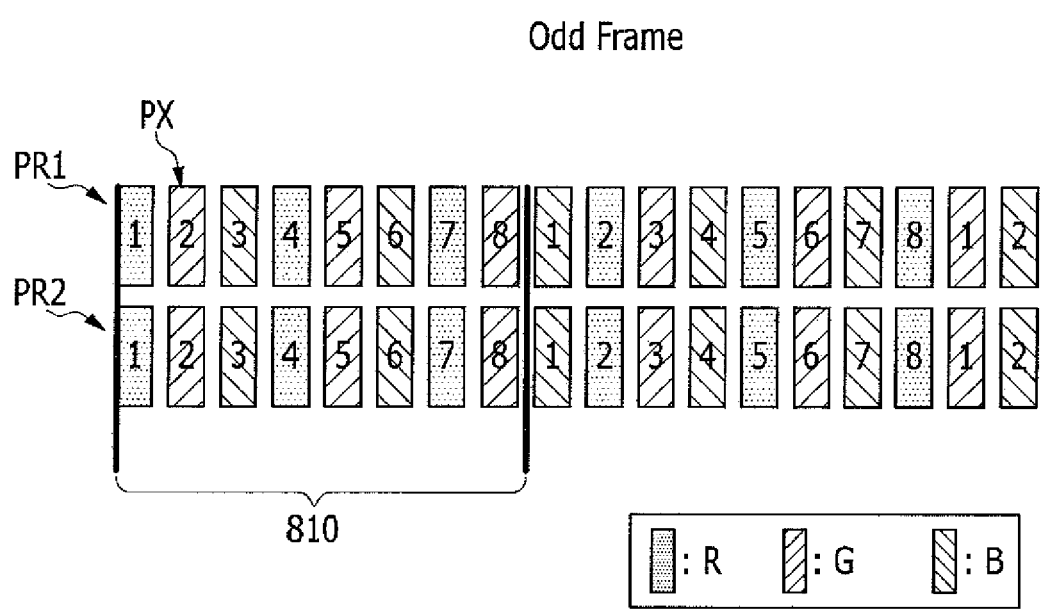
FIGS. 46 and 47 are plan views of one example of a method in which a three dimensional image display device according to an exemplary embodiment of the present disclosure displays one 3D image by time multiplexing for two frames, and the primary color pixel positions of one dot of an image observed in one view point for two frames.
Figure 47:
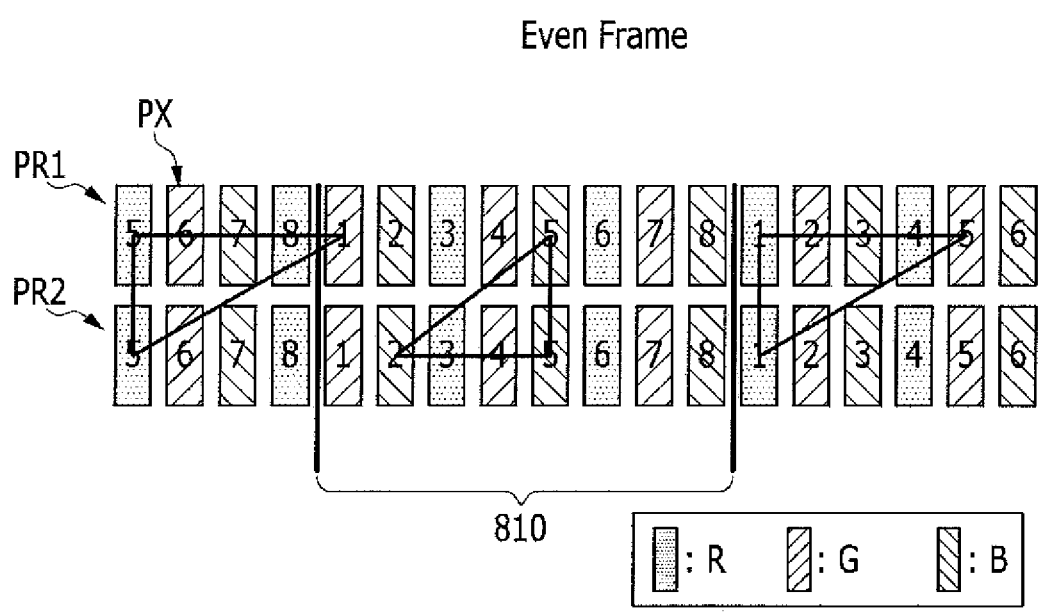

FIGS. 46 and 47 are plan views of an example of a method in which a three dimensional image display device according to an exemplary embodiment of the present disclosure displays a 3D image for two frames by time multiplexing, and the primary color pixel positions for one dot of an image are observed in one view point for two frames.

Referring to FIGS. 46 and 47, an exemplary embodiment is substantially the same as exemplary embodiments described above, except that an extended direction of the lenticular lens 810 or an arrangement direction of the parallax barrier openings 820 may be parallel to the column direction. FIGS. 46 and 47 illustrate an exemplary embodiment in which a lenticular lens 810 is used. In this case, two pixel rows PR1 and PR2 corresponding to one lenticular lens 810 differ in an arrangement of the primary colors of the pixels PXs. For example, the primary color pixels PXs may be arranged in a diagonal direction with respect to the column direction, and FIGS. 46 and 47 illustrate an example of how each primary color pixel PX moves and is disposed by a lateral pitch of the pixel PX whenever the pixel row changes.

In an exemplary embodiment, FIG. 47 illustrates an example in which the lenticular lens 810 moves right or left by approximately ½ of the lenticular lens 810 pitch while maintaining the slope thereof when the frame changes, but embodiments of the present disclosure are not limited thereto. In this case, as illustrated in FIG. 47, two dot triangles are formed for each view point in two pixel rows PR1 and PR2 and 12 pixel columns to implement approximately ½ resolution in each of the lateral direction and the longitudinal direction with respect to all pixels.

While this disclosure has been described in connection with what is presently considered to be practical exemplary embodiments, it is to be understood that embodiments of the disclosure is not limited to the disclosed embodiments, but, on the contrary, is intended to cover various modifications and equivalent arrangements included within the spirit and scope of the appended claims.

What is claimed is:

1. A three dimensional image display device, comprising:
a display panel that includes a plurality of pixels arranged in a matrix form, wherein each pixel displays one color of a plurality of primary colors; and
a view point division unit configured to divide a 3D image displayed by the display panel into two or more view points,
wherein the display panel comprises a plurality of dots, each dot comprises a set of pixels, each pixel in the set shows a different primary color, and each dot displays a 3D image for a view point during a frame set that includes a plurality of frames,
the view point division unit moves in a row direction when a frame changes in the frame set, and
at least one pixel of the dot is selected to display the 3D image in each frame of the frame set,
wherein a resolution of the 3D image displayed for one frame set is ½ with respect to all pixels in both a column direction and a row direction.

2. The three dimensional image display device of claim 1, wherein:
the view point division unit includes a plurality of view point division elements that correspond to each set of the plurality of pixels that display respective images in the two or more view points, and
primary colors of a first pixel row and an adjacent second pixel row that correspond to one view point division element differ from each other.

3. The three dimensional image display device of claim 2, wherein:
the view point division unit includes a plurality of lenticular lenses or a parallax barrier that includes a plurality of openings.

4. The three dimensional image display device of claim 3, wherein:
the view point division element is inclined to form an acute angle with a column direction, and
pixels of a pixel column show a same primary color.

5. The three dimensional image display device of claim 3, wherein:
the view point division elements extend parallel to a column direction, and
pixels in a line that show a same primary color are arranged in a diagonal direction.

6. The three dimensional image display device of claim 1, wherein:
a number of the primary colors is 3, and a number of the two or more view points is not a multiple of 3.

7. The three dimensional image display device of claim 6, wherein:
when a frame set includes two frames, two pixels of one dot are selected in one frame of the two frames, and the other one pixel of the one dot is selected in the other frame of the two frames.

8. A method of displaying a 3D image, comprising:
displaying, by a display panel, a 3D image during a frame set that includes a plurality of frames;
dividing, by a view point division unit, the 3D image into two or more view points; and
moving the view point division unit in a row direction when a frame changes in the frame set,
wherein the display panel includes a plurality of pixels arranged in a matrix form, wherein each pixel displays one color of a plurality of primary colors, and
a plurality of dots each comprising a set of pixels, each pixel in the set showing a different primary color, and at least one pixel of the dot is selected to display the 3D image in each frame of the frame set,
wherein a resolution of the 3D image displayed for one frame set is ½ with respect to all pixels in both a column direction and a row direction.

9. The method of displaying a 3D image of claim 8, wherein:
the view point division unit includes a plurality of view point division elements that correspond to each set of the plurality of pixels that display respective images in the two or more view points, and
primary colors of a first pixel row and an adjacent second pixel row that correspond to one view point division element differ from each other.

10. The method of displaying a 3D image of claim 9, wherein:
the view point division unit includes a plurality of lenticular lenses or a parallax barrier that includes a plurality of openings.

11. The method of displaying a 3D image of claim 10, wherein:
the view point division element is inclined to form an acute angle with a column direction, and
pixels of a pixel column show a same primary color.

12. The method of displaying a 3D image of claim 10, wherein:
the view point division elements extend parallel to a column direction, and
pixels in a line that show a same primary color are arranged in a diagonal direction.

13. The method of displaying a 3D image of claim 8, wherein:
when a number of the primary colors is 3, and a number of the two or more view points is not a multiple of 3.

14. The method of displaying a 3D image of claim 13, wherein:
when a frame set includes two frames, two pixels of one dot are selected in one frame of the two frames and the other one pixel of the one dot is selected in the other frame of the two frames.

15. A three dimensional image display device, comprising:
a display panel that includes a plurality of dots each dot comprises a set of pixels, each pixel in the set shows a different primary color, and each dot displays a 3D image for a view point during a frame set that includes a plurality of frames; and a view point division unit includes a plurality of view point division elements that correspond to each set of a plurality of pixels that display respective images in the two or more view points, wherein when a frame set includes two frames, two pixels of one dot are selected for display in one frame of the two frames, and the other one pixel of the one dot is selected for display in the other frame of the two frames, wherein a resolution of the 3D image displayed for one frame set is ½ with respect to all pixels in both a column direction and a row direction.

16. The three dimensional image display device of claim 15, wherein:

the view point division unit moves in a row direction when a frame changes in the frame set, and primary colors of a first pixel row and an adjacent second pixel row that correspond to one view point division element differ from each other.

17. The three dimensional image display device of claim 15, wherein:

the view point division unit includes a plurality of lenticular lenses or a parallax barrier that includes a plurality of openings.

\* \* \* \* \*